(12) United States Patent
Miyanabe et al.

(10) Patent No.: US 7,978,571 B2
(45) Date of Patent: Jul. 12, 2011

(54) RECORDING DEVICE AND METHOD, COMPUTER PROGRAM, AND RECORDING MEDIUM

(75) Inventors: Shogo Miyanabe, Higashiyamato (JP); Hiroyuki Uchino, Tokorozawa (JP); Yoshio Sasaki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 12/670,729

(22) PCT Filed: Aug. 1, 2007

(86) PCT No.: PCT/JP2007/065091
§ 371 (c)(1),
(2), (4) Date: Apr. 21, 2010

(87) PCT Pub. No.: WO2009/016752
PCT Pub. Date: Feb. 5, 2009

(65) Prior Publication Data
US 2010/0202266 A1 Aug. 12, 2010

(51) Int. Cl.
*G11B 15/52* (2006.01)
(52) U.S. Cl. ............... 369/47.17; 369/47.51; 369/53.26; 369/53.33
(58) Field of Classification Search .................. None
See application file for complete search history.

(56) References Cited

U.S. PATENT DOCUMENTS

| 6,278,675 | B1 | 8/2001 | Kuribayashi et al. |
| 6,925,041 | B2 | 8/2005 | Kai et al. |
| 2002/0186633 | A1 | 12/2002 | Kai et al. |
| 2005/0094518 | A1 | 5/2005 | Ueki |

FOREIGN PATENT DOCUMENTS

| JP | 1-205763 | 8/1989 |
| JP | 11-259985 | 9/1999 |
| JP | 2003-030837 | 1/2003 |
| JP | 2005-158148 | 6/2005 |
| JP | 2006-120208 | 5/2006 |

OTHER PUBLICATIONS

International Search Report, PCT/JP2007/065091, Nov. 13, 2007.

*Primary Examiner* — Paul Huber
(74) *Attorney, Agent, or Firm* — Young & Thompson

(57) ABSTRACT

A recording apparatus (1) is provided with: a recording device (11) for recording a data pattern onto a recording medium (100); a first controlling device (22) for stopping the recording; a reading device (11) for reading the data pattern which is recorded immediately before the recording is stopped, thereby obtaining a read signal; a measuring device (19) for measuring jitter of the read signal; an adjusting device (21) for adjusting a recording condition such that the jitter satisfies a desired condition, and a second controlling device (22) for restarting the recording of the data pattern by using the adjusted recording condition.

15 Claims, 14 Drawing Sheets

[FIG. 1]
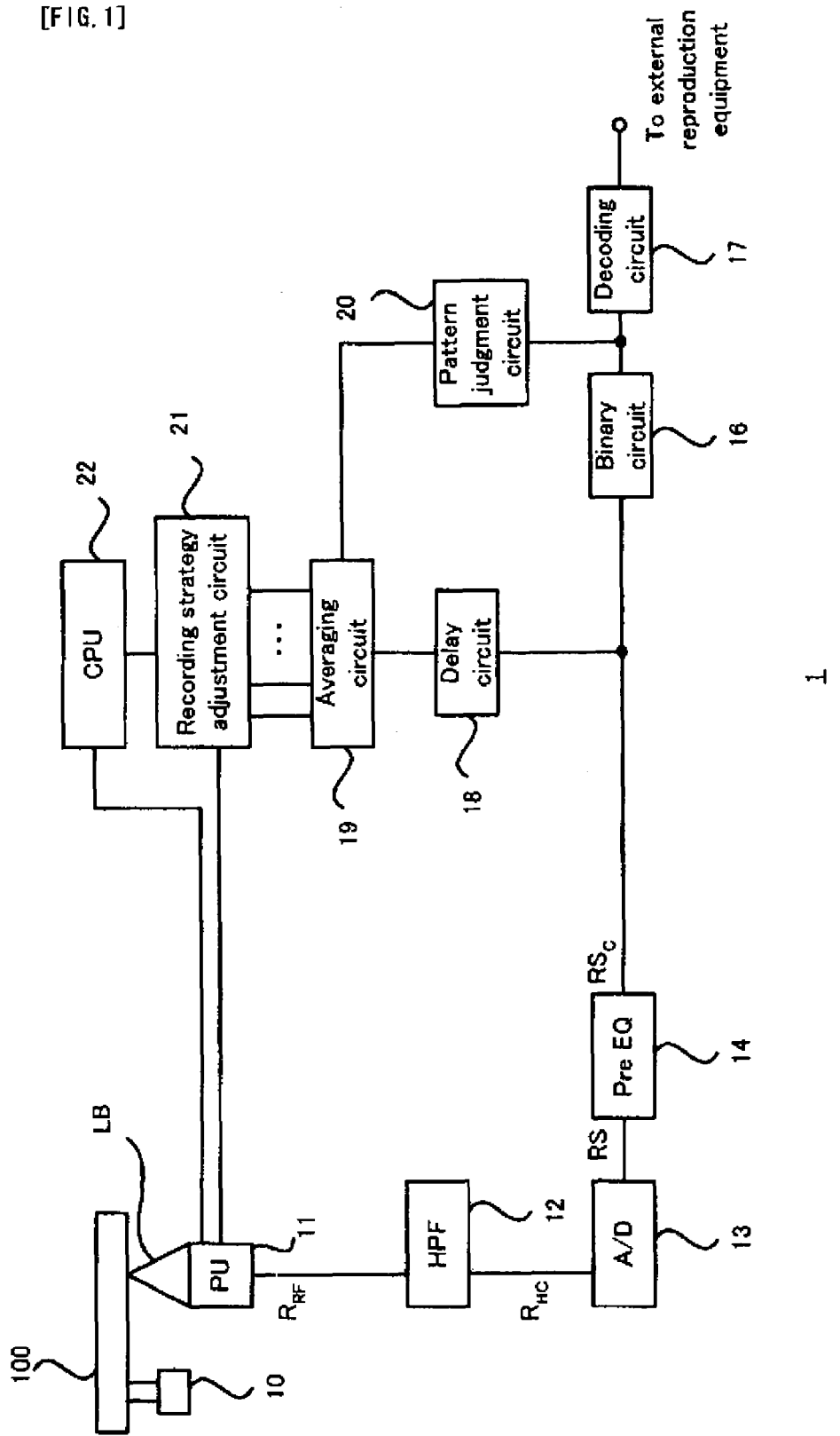

[FIG. 2]
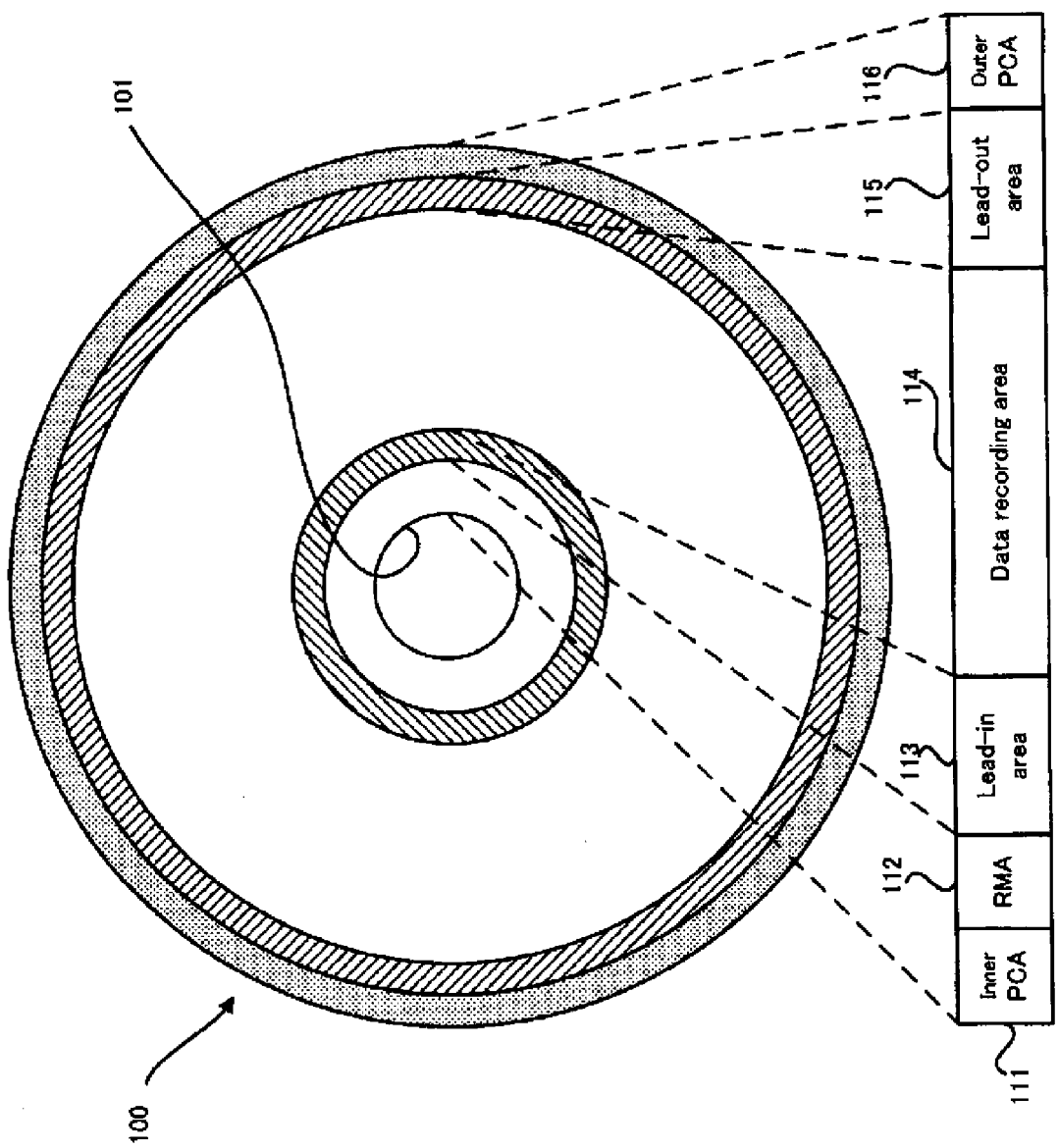

[FIG. 3]
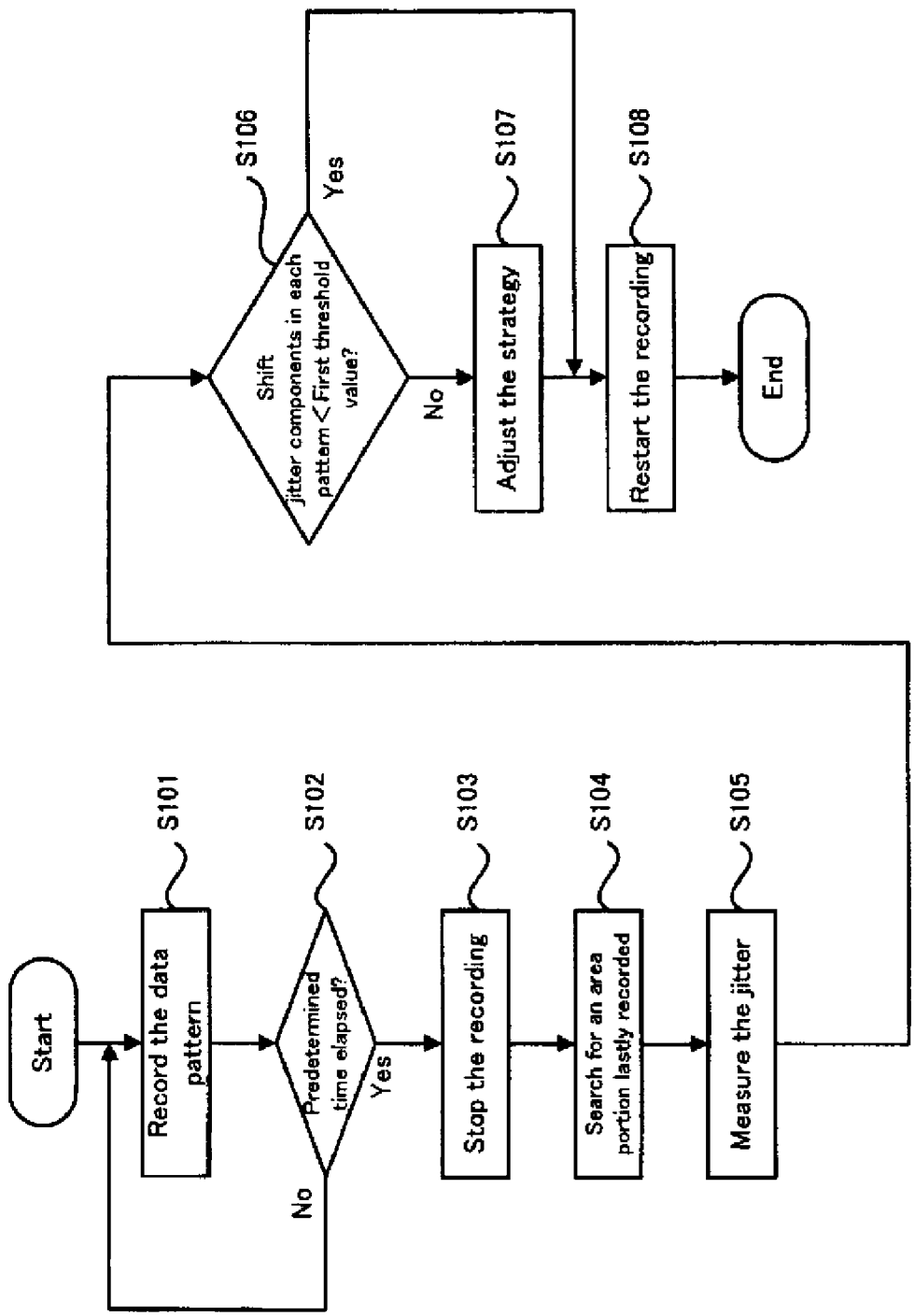

[FIG. 4]
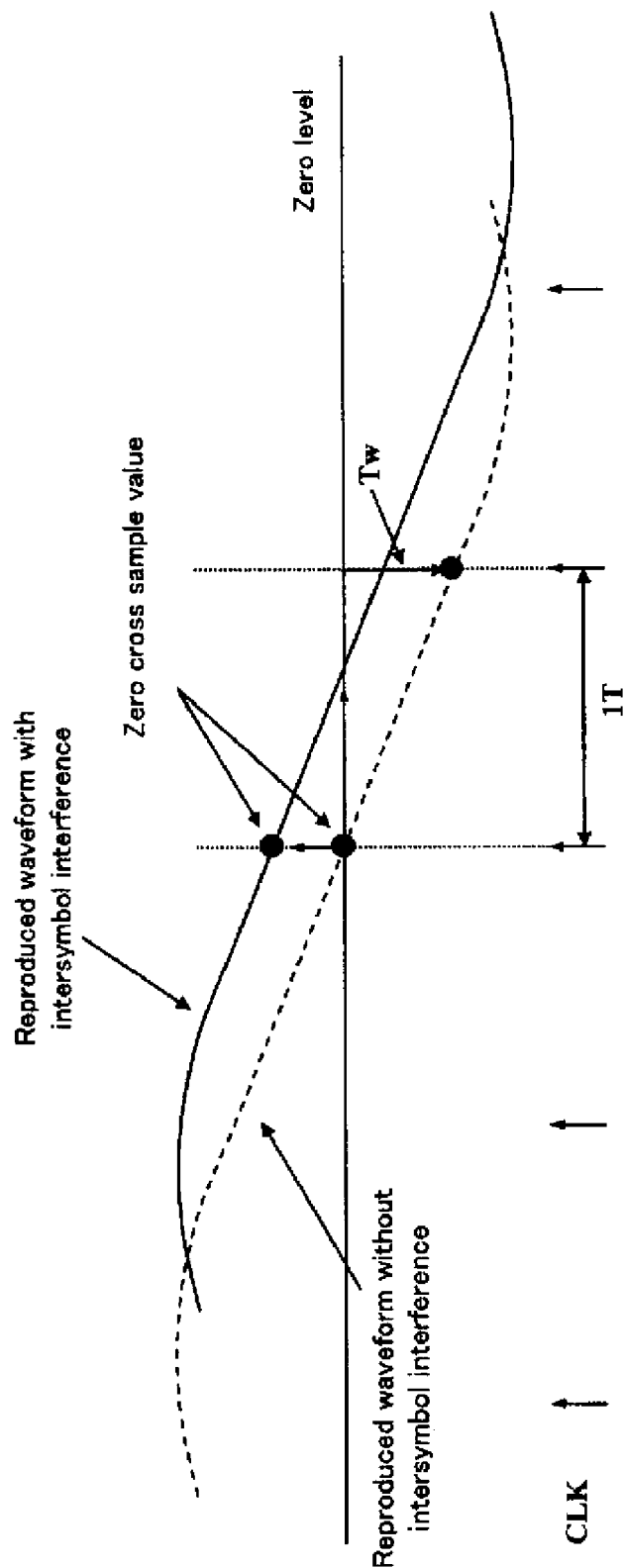

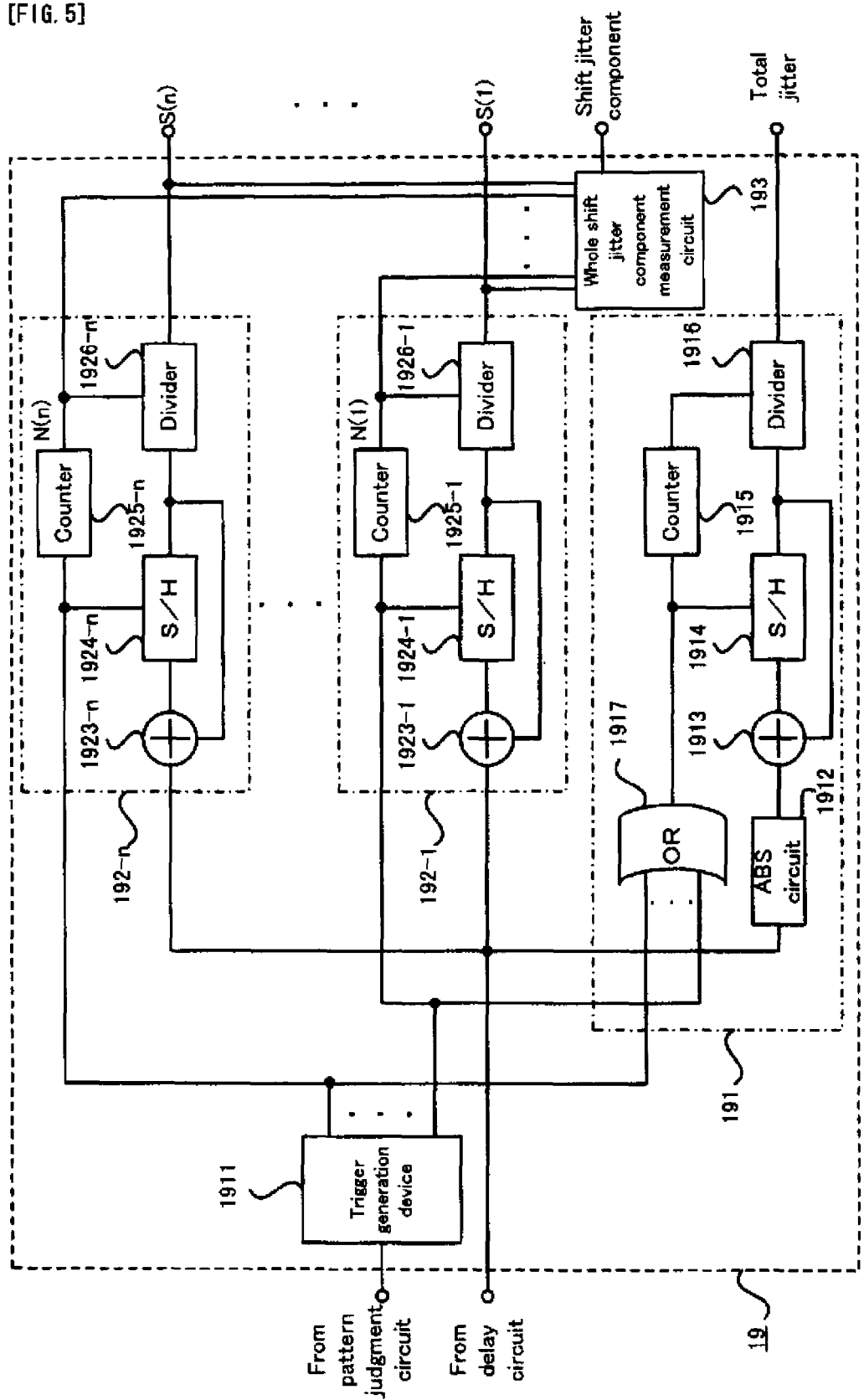
[FIG. 5]

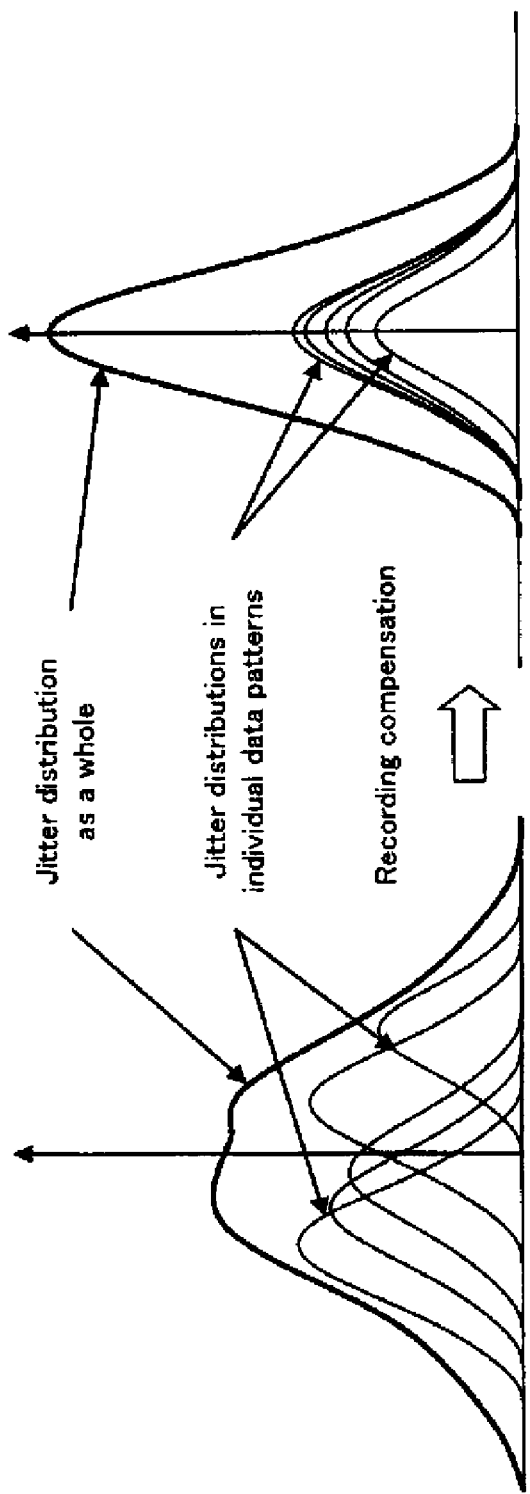
[FIG. 6]

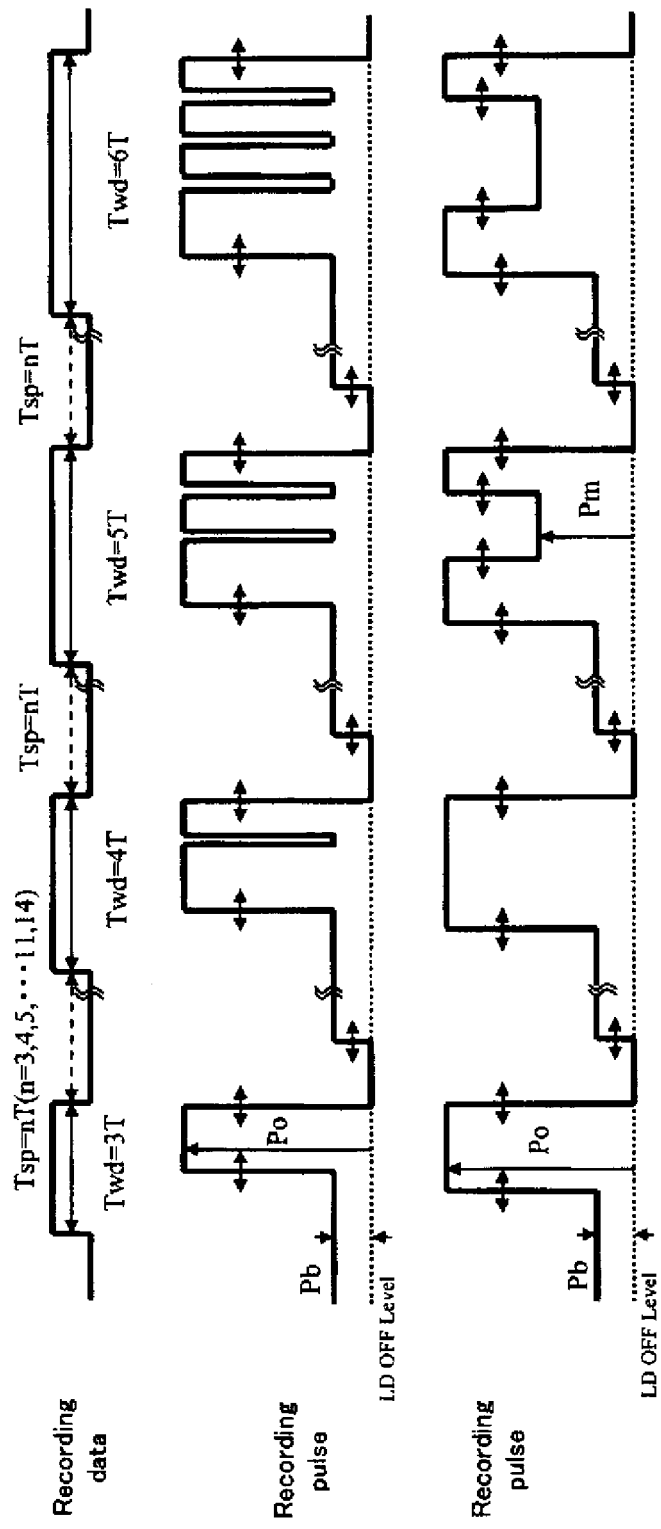
[FIG. 7]

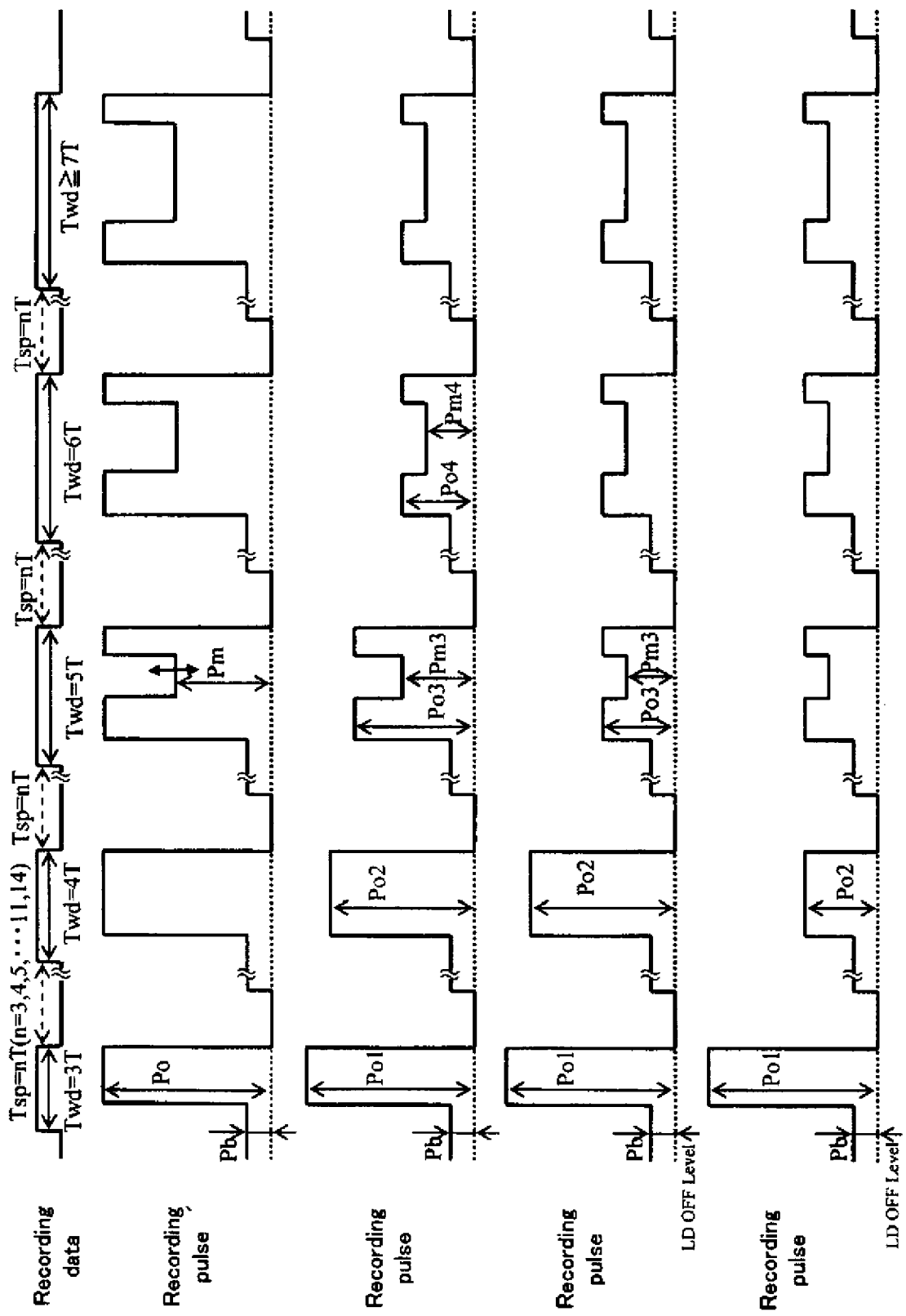
[FIG. 8]

[FIG. 9]
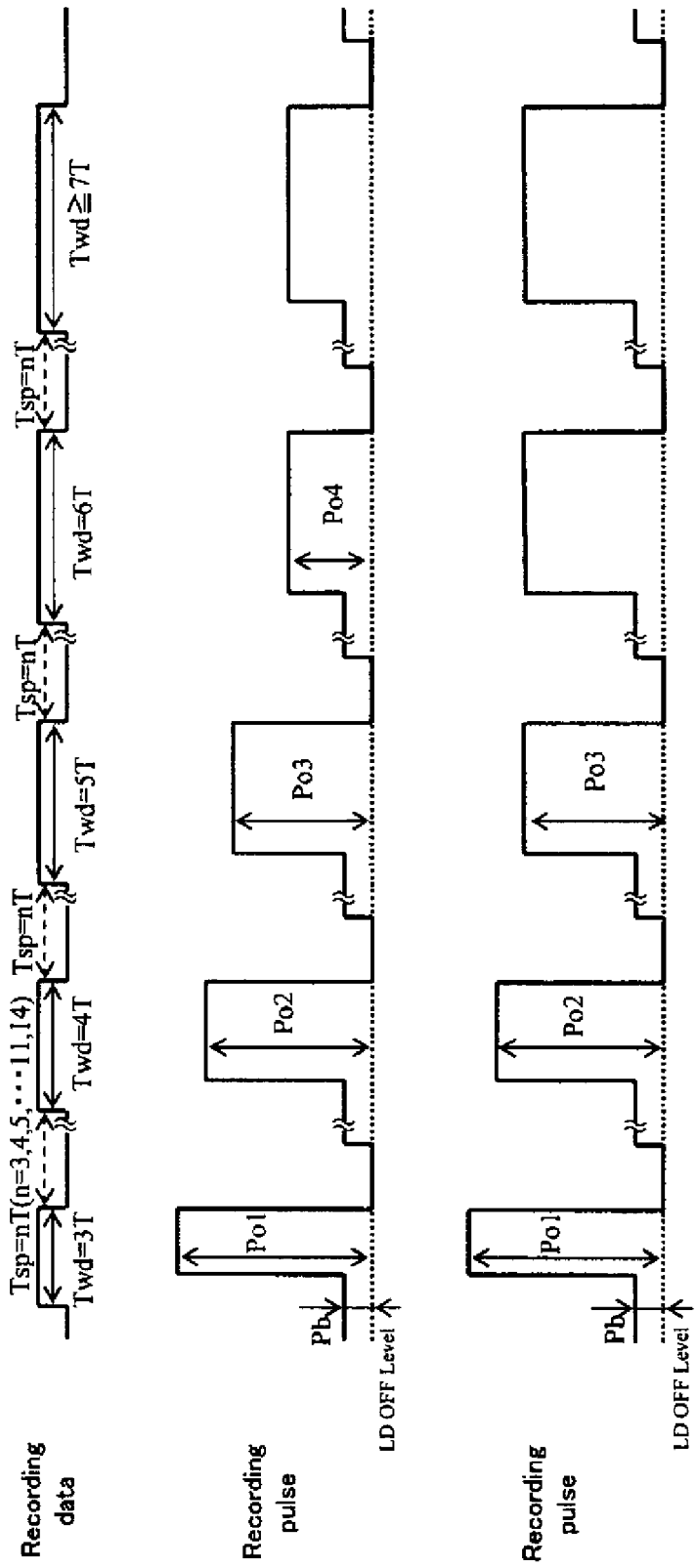

[FIG. 10]
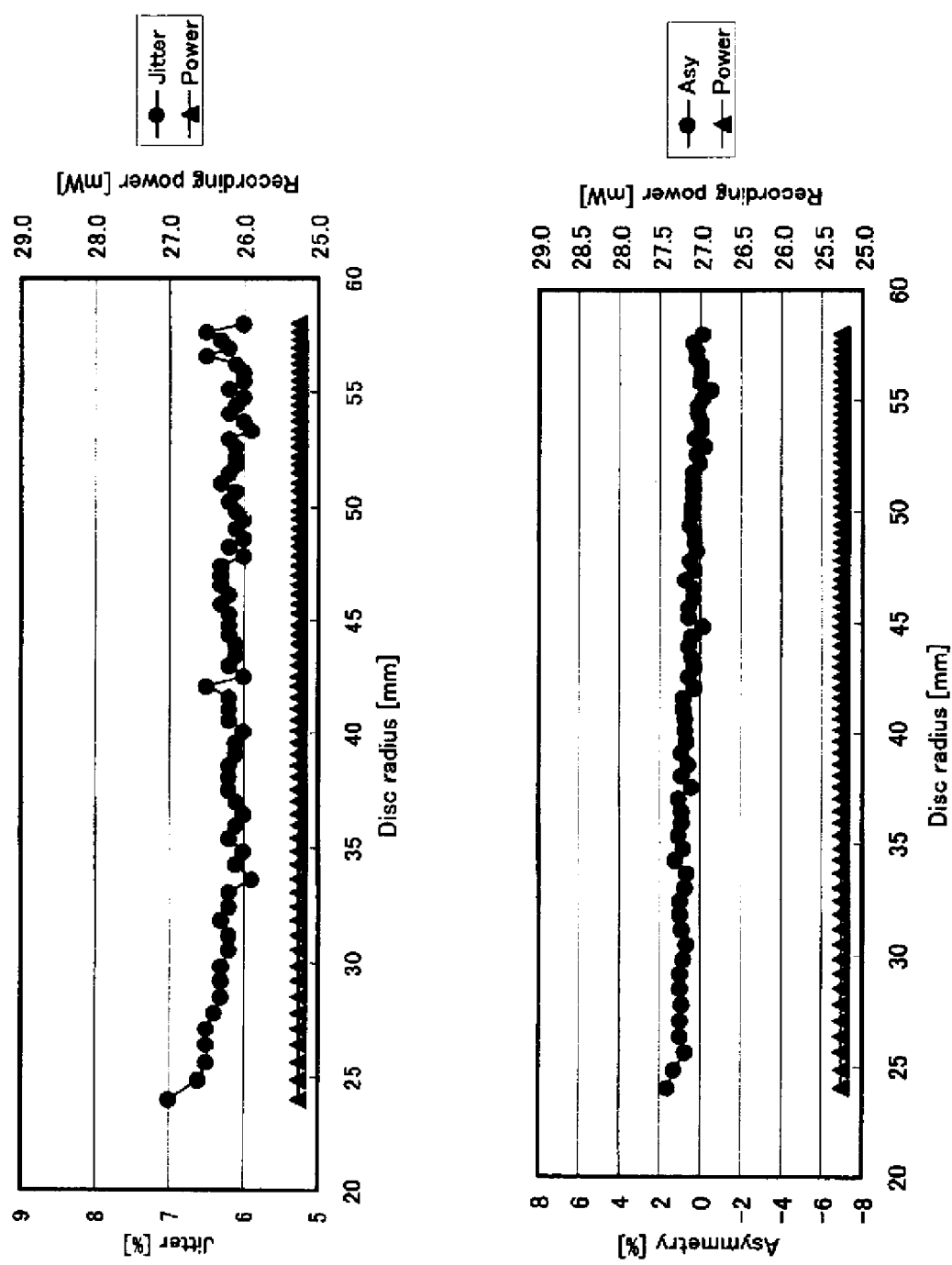

[FIG. 11]
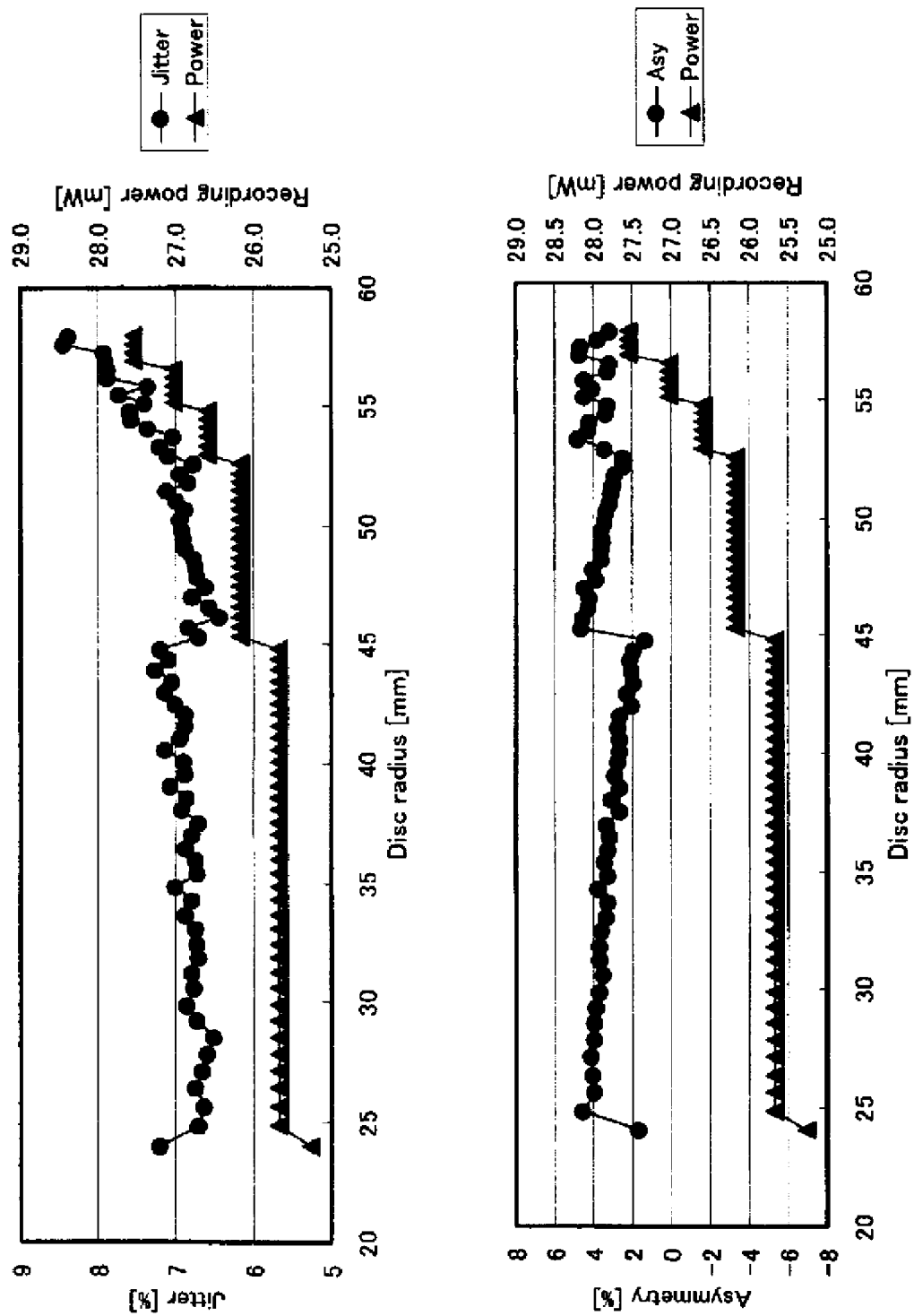

[FIG. 12]
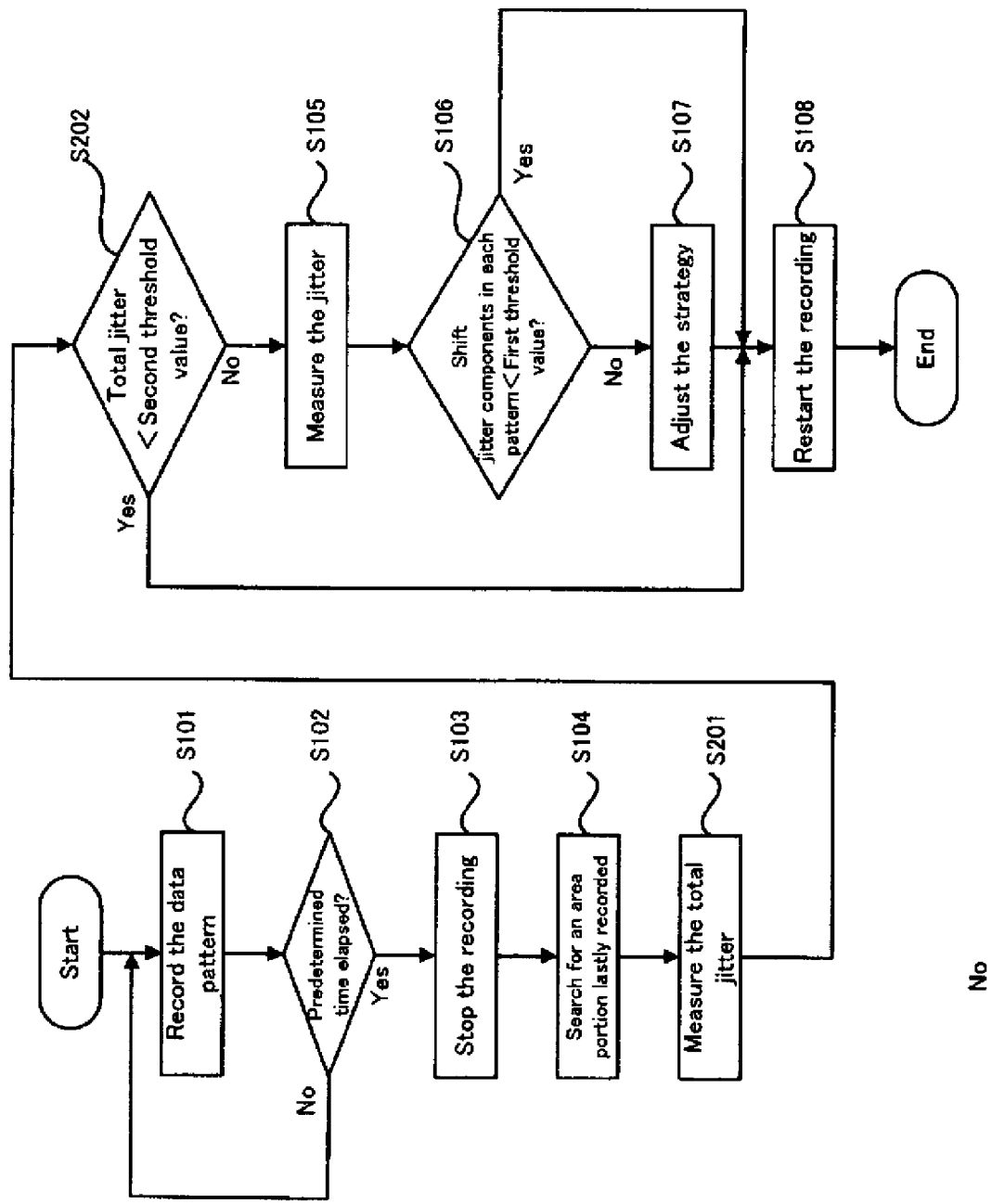

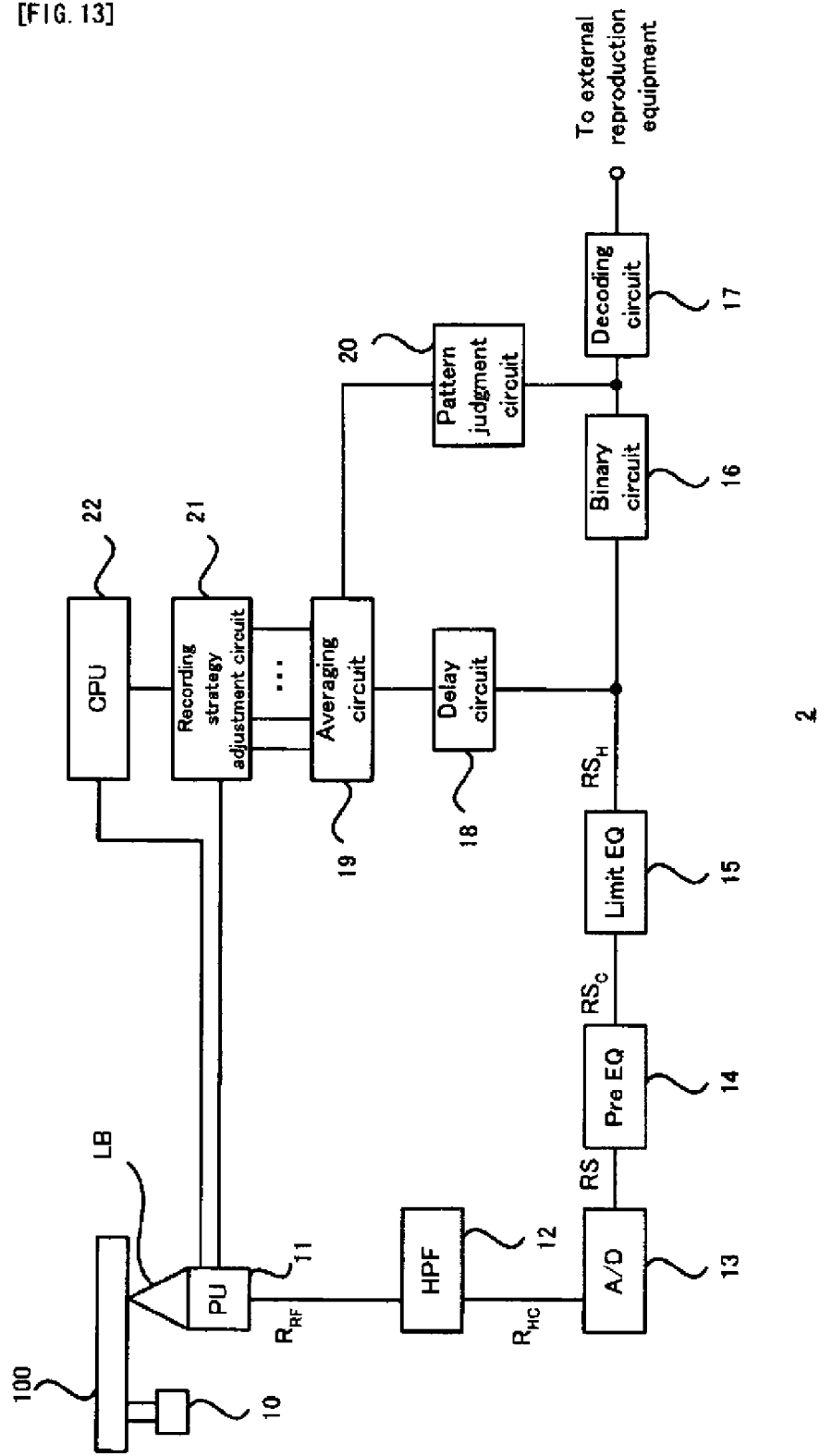
[FIG. 13]

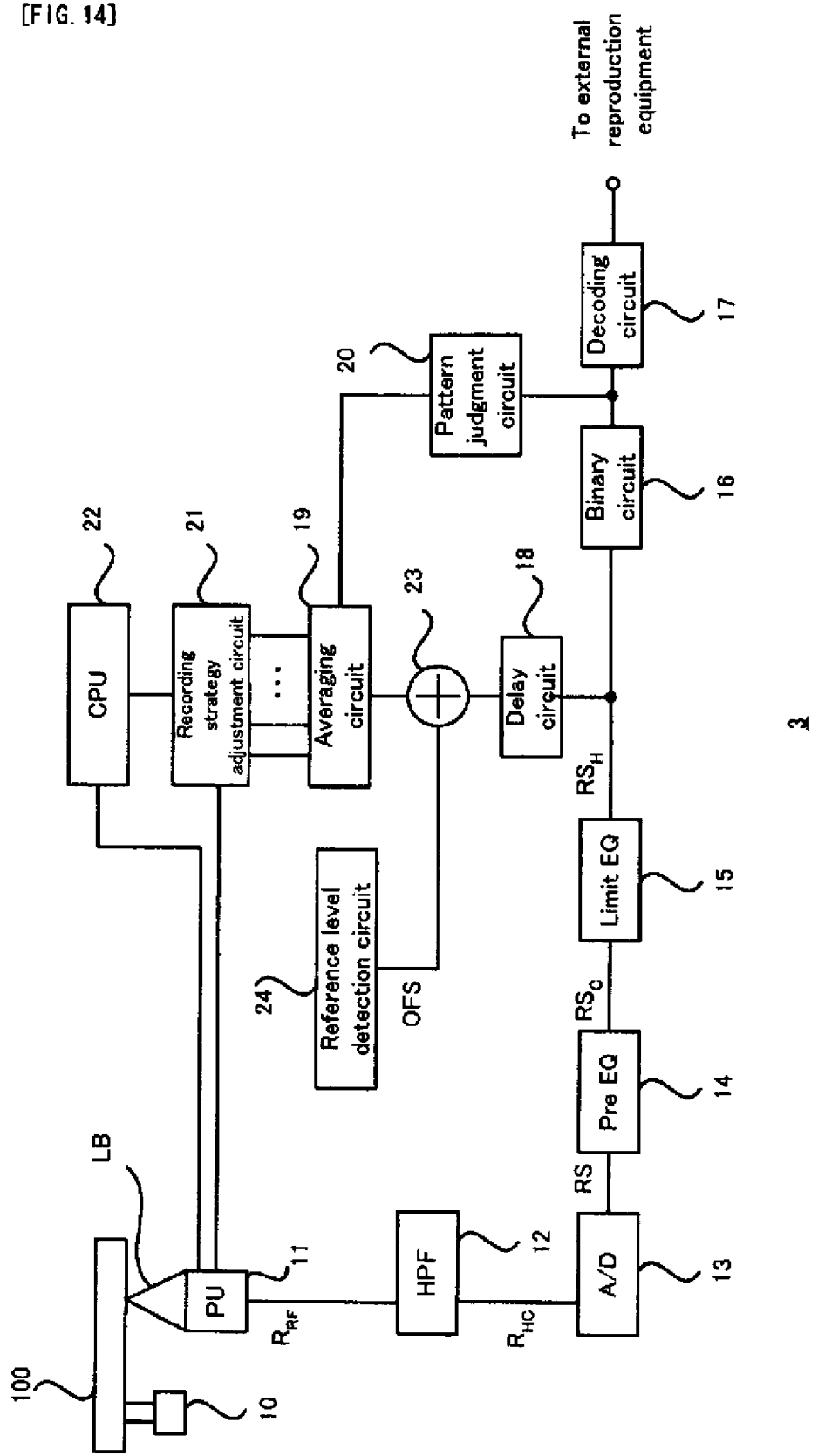
[FIG. 14]

RECORDING DEVICE AND METHOD, COMPUTER PROGRAM, AND RECORDING MEDIUM

TECHNICAL FIELD

The present invention relates to a recording apparatus for and a recording method of recording a data pattern onto a recording medium, a computer program which makes a computer as such a recording apparatus, and the recording medium.

BACKGROUND ART

Optical discs (or recording media) such as a DVD and a Blu-ray disc have been rapidly spread. In such optical discs, various technologies have been suggested for OPC (Optimum Power Control) which appropriately adjusts a power of a laser beam (specifically, a recording power). For example, a patent document 1 discloses a technology of running OPC which corrects the power, as occasion demands, during the recording of a data pattern in order to compensate for deterioration of recording properties caused by variation in the recording sensitivity of an optical disc.

Patent document 1: Japanese Patent Application Laid Open No. 2006-120208

DISCLOSURE OF INVENTION

Subject to be Solved by the Invention

In the aforementioned background art, only the power of the laser beam is corrected with reference to asymmetry or a β value. In other words, the deterioration of the recording properties caused by the variation in the recording sensitivity of the optical disc or the like is compensated for by uniformly correcting the power of the laser beam. However, even if the asymmetry can be set to an optimum value, there is likely such a technical problem that jitter likely deteriorates. Thus, even if the recording power is uniformly corrected, it is hard to say that the optimum recording can be performed.

In view of the aforementioned problems, it is therefore an object of the present invention to provide, for example, a recording apparatus and method which can more preferably compensate for deterioration of recording properties caused by variation in the recording sensitivity of a recording medium or the like, as well as a computer program and a recording medium.

Means for Solving the Subject

The above object of the present invention can be achieved by a recording apparatus provided with: a recording device for recording a data pattern onto a recording medium; a first controlling device for controlling the recording device to stop the recording of the data pattern; a reading device for reading the data pattern which is recorded immediately before the recording is stopped, thereby obtaining a read signal; a measuring device for measuring jitter of the read signal; an adjusting device for adjusting a recording condition of the recording device such that the jitter which is measured by the measuring device satisfies a desired condition; and a second controlling device for controlling the recording device to restart the recording of the data pattern by using the recording condition which is adjusted by the adjusting device.

The above object of the present invention can be also achieved by a recording method in a recording apparatus comprising a recording device for recording a data pattern onto a recording medium, the recording method provided with: a first controlling process of controlling the recording device to stop the recording of the data pattern; a reading process of reading the data pattern which is recorded on the recording medium, thereby obtaining a read signal; a measuring process of measuring jitter of the read signal; an adjusting process of adjusting a recording condition of the recording device such that the jitter which is measured by the measuring device satisfies a desired condition; and a second controlling process of controlling the recording device to restart the recording of the data pattern by using the recording condition which is adjusted in the adjusting process.

The above object of the present invention can be also achieved by a computer program for recording control and for controlling a computer provided in a recording apparatus provided with: a recording device for recording a data pattern onto a recording medium; a first controlling device for controlling the recording device to stop the recording of the data pattern; a reading device for reading the data pattern which is recorded on the recording medium, thereby obtaining a read signal; a measuring device for measuring jitter of the read signal; an adjusting device for adjusting a recording condition of the recording device such that the jitter which is measured by the measuring device satisfies a desired condition; and a second controlling device for controlling the recording device to restart the recording of the data pattern by using the recording condition which is adjusted by the adjusting device, the computer program making the computer function as at least one portion of the recording device, the first controlling device, the reading device, the measuring device, the adjusting device, and the second controlling device.

The above object of the present invention can be also achieved by a first recording medium provided with a recording condition recording area to record therein a recording condition which is adjusted by an information recording apparatus provided with: a recording device for recording a data pattern onto a recording medium; a first controlling device for controlling the recording device to stop the recording of the data pattern; a reading device for reading the data pattern which is recorded on the recording medium, thereby obtaining a read signal; a measuring device for measuring jitter of the read signal; an adjusting device for adjusting the recording condition of the recording device such that the jitter which is measured by the measuring device satisfies a desired condition; and a second controlling device for controlling the recording device to restart the recording of the data pattern by using the recording condition which is adjusted by the adjusting device.

The above object of the present invention can be also achieved by a second recording medium on which a data pattern is recorded by using a recording condition which is adjusted by an information recording apparatus provided with: a recording device for recording the data pattern onto a recording medium; a first controlling device for controlling the recording device to stop the recording of the data pattern; a reading device for reading the data pattern which is recorded on the recording medium, thereby obtaining a read signal; a measuring device for measuring jitter of the read signal; an adjusting device for adjusting the recording condition of the recording device such that the jitter which is measured by the measuring device satisfies a desired condition; and a second controlling device for controlling the recording device to restart the recording of the data pattern by using the recording condition which is adjusted by the adjusting device.

The operation and other advantages of the present invention will become more apparent from the embodiments explained below.

BRIEF DESCRIPTION OF DRAWINGS

FIG. 1 is a block diagram conceptually showing the basic structure of a recording apparatus in a first example.

FIG. 2 is a schematic plan view showing the basic structure of an optical disc and a schematic conceptual view showing a recording area structure in the radial direction of the optical disc.

FIG. 3 is a flowchart conceptually showing a flow of operations in a first operation example of the recording apparatus in the first example.

FIG. 4 is a waveform diagram conceptually showing an operation of measuring jitter by an averaging circuit, on a read sample value series.

FIG. 5 is a block diagram conceptually showing the basic structure of the averaging circuit.

FIG. 6 is a graph conceptually showing the states of shift jitter components in respective data patterns and a shift jitter component as a whole before recording compensation and the states of shift jitter components in respective data patterns and a shift jitter component as a whole after the recording compensation.

FIG. 7 is a timing chart conceptually showing a first aspect of a recording strategy adjustment operation.

FIG. 8 is a timing chart conceptually showing a second aspect of the recording strategy adjustment operation.

FIG. 9 is a timing chart conceptually showing a third aspect of the recording strategy adjustment operation.

FIG. 10 is graphs conceptually showing total jitter and asymmetry of the data patterns recorded by the recording apparatus in the first example.

FIG. 11 is graphs conceptually showing total jitter and asymmetry on a recording apparatus which does not perform the recording compensation operation and corrects only the power of a laser beam.

FIG. 12 is a flowchart conceptually showing a flow of operations in a second operation example of the recording apparatus in the first example.

FIG. 13 is a block diagram conceptually showing the basic structure of an information recording apparatus in a second example.

FIG. 14 is a block diagram conceptually showing the basic structure of an information recording apparatus in a third example.

DESCRIPTION OF REFERENCE CODES 1, 2, 3 recording apparatus
10 spindle motor
11 pickup
12 HPF
13 A/D converter
14 pre-equalizer
15 limit equalizer
16 binary circuit
17 decoding circuit
18 delay circuit
19 averaging circuit
20 pattern judgment circuit
21 recording strategy setting circuit
22 CPU
23 adder
24 reference level detection device

BEST MODE FOR CARRYING OUT THE INVENTION

Hereinafter, as the best mode for carrying out the present invention, an explanation will be given on embodiments of the recording apparatus and method, the computer program, and the recording medium of the present invention.

(Embodiment of Recording Apparatus)

An embodiment of the information recording apparatus of the present invention is a recording apparatus provided with: a recording device for recording a data pattern onto a recording medium; a first controlling device for controlling the recording device to stop the recording of the data pattern; a reading device for reading the data pattern which is recorded immediately before the recording is stopped, thereby obtaining a read signal; a measuring device for measuring jitter of the read signal; an adjusting device for adjusting a recording condition of the recording device such that the jitter which is measured by the measuring device satisfies a desired condition; and a second controlling device for controlling the recording device to restart the recording of the data pattern by using the recording condition which is adjusted by the adjusting device.

According to the embodiment of the recording apparatus of the present invention, by the operation of the recording device, the recording medium is irradiated, for example, with a laser beam or the like, and as a result, the data pattern according to the data to be recorded is recorded onto the recording medium.

Here, on the recording apparatus in the embodiment, a recording compensation operation explained below is performed in parallel with the operation of recording the data pattern which is performed by the recording device (in particular, the operation of recording the data pattern into a user data area or a data recording area which are provided for the recording medium).

Firstly, by the operation of the first controlling device, the operation of recording the data pattern by the recording device is temporarily stopped. Here, the recording operation may be stopped every time a predetermined amount of data pattern is recorded. Alternatively, the recording operation may be stopped every time a predetermined period elapses. Alternatively, the recording operation may be stopped in other arbitrary timing.

After the recording operation is stopped, the data pattern which is recorded immediately before the recording operation is stopped is read by the operation of the reading device. As a result, the read signal is obtained. Then, by the operation of the measuring device, the jitter of the read signal is detected. Then, by the operation of the adjusting device, the recording condition (specifically, for example, recording strategy) of the recording device is adjusted such that the detected jitter satisfies the desired condition. In other words, the recording compensation operation is performed. After the recording condition is adjusted, the recording of the data pattern is restarted, under the control of the second controlling device.

By this, the jitter of the read signal obtained by reading the data pattern which is recorded after the adjustment of the recording condition satisfies the desired condition. Therefore, it is possible to improve the reading quality of the read signal (in other words, recording quality or reproduction quality).

Moreover, since the recording condition can be adjusted as occasion demands during the recording of the data pattern, it is possible to preferably compensate for deterioration of recording properties which is caused by variation in the recording sensitivity of the recording medium (e.g. caused by a difference between the recording sensitivity in an inner area portion and the recording sensitivity in an outer area portion).

In particular, in the embodiment, instead of uniformly correcting only the power of the laser power, the recording condition (i.e. recording strategy or the like) in each individual data pattern is independently corrected. Thus, as explained later in detail using the drawings, it is possible to preferably compensate for the deterioration of the recording properties, in comparison to the case where only the power is uniformly corrected. In other words, even if the power is not corrected, if the recording condition is adjusted such that the jitter satisfies the desired condition, it is possible to maintain another recording property such as asymmetry in a preferable state.

In one aspect of the embodiment of the recording apparatus of the present invention, the recording medium comprises a data recording area to record therein the data pattern corresponding to user data, and the first controlling device controls the recording device to stop the recording of the data pattern in arbitrary timing of recording the data pattern corresponding to the user data into the data recording area.

According to this aspect, when the actual user data is recorded, the recording condition can be adjusted in accordance with the jitter of the user data. Thus, the recording operation can be preferably performed throughout substantially the entire surface of the recording medium.

In another aspect of the embodiment of the recording apparatus of the present invention, the measuring device measures, as the jitter, a shift jitter component which is caused by a state of the recorded data pattern from among the jitter, and the adjusting device adjusts the recording condition such that the shift jitter component as the jitter satisfies the desired condition.

According to this aspect, not the random jitter component, which is hardly predicted or which cannot be predicted, but the shift jitter component which is caused by the state of the data pattern which depends on the recording condition is measured. Therefore, by adjusting the recording condition, it is possible to preferably perform the recording compensation operation such that the shift jitter component satisfies the desired condition, relatively easily.

In an aspect of the recording apparatus in which the recording condition is adjusted such that the shift jitter component satisfies the desired condition, as described above, a state in which the jitter satisfies the desired condition may be a state in which the shift jitter component is less than or equal to a first predetermined value.

By virtue of such construction, it is possible to preferably perform the recording compensation operation so as to reduce the shift jitter component.

In an aspect of the recording apparatus in which the recording condition is adjusted such that the shift jitter component satisfies the desired condition, as described above, a state in which the jitter satisfies the desired condition may be a state in which a ratio of a random jitter component, which is caused by a noise from among the jitter, to the jitter is greater than or equal to a second predetermined value.

The jitter is indicated by the square root of a sum of the square of the random jitter component and the square of the shift jitter component. Thus, if the random jitter component is greater than the shift jitter component (i.e. if the ratio of the random jitter component to the jitter is relatively large), the jitter is hardly reduced even if the shift jitter component is reduced. Therefore, by virtue of such construction, it is possible to perform the recording compensation operation such that a jitter-reduction effect is preferably achieved by the adjustment of the recording condition. In other words, it is possible to preferably avoid the inefficient recording compensation operation in which the jitter-reduction effect is not preferably achieved by the adjustment of the recording condition.

In an aspect of the recording apparatus in which the recording condition is adjusted such that the shift jitter component satisfies the desired condition, as described above, a state in which the jitter satisfies the desired condition is a state in which the shift jitter components in a plurality of types of respective data patterns with different run lengths may be substantially same to each other.

By virtue of such construction, it is possible to match the shift jitter components in a plurality of types of respective data patterns (e.g. 10 types of data patterns with run lengths of 3 T to 11 T and 14 T if the information recording medium is a DVD, and 7 types of data patterns with run lengths of 2 T to 9 T if the information recording medium is a Blu-ray Disc). In other words, instead of narrowing jitter distributions in the respective data patterns, it is possible to match the average values of the jitter distributions in the respective data patterns (i.e. the shift jitter components). By this, it is possible to perform the recording compensation operation which reduces the jitter, preferably and relatively easily.

In an aspect of the recording apparatus in which the recording condition is adjusted such that the shift jitter component satisfies the desired condition, as described above, the measuring device may measure, as the shift jitter component, an average value in each data pattern of sample values of the read signal which is the closest to a zero level point By virtue of such construction, it is possible to measure the shift jitter component, preferably and relatively easily.

In an aspect of the recording apparatus in which the recording condition is adjusted such that the shift jitter component satisfies the desired condition, as described above, the adjusting device may preferentially adjust the recording condition which is used to record the data pattern having the relatively large shift jitter component out of a plurality of type of the data patterns with different run lengths.

By virtue of such construction, it is possible to reduce the jitter more efficiently, in comparison to the construction that the recording condition in each data pattern is randomly adjusted.

In another aspect of the embodiment of the recording apparatus of the present invention, the recording device applies a laser beam, thereby recording the data pattern, and the recording condition is at least one of an amplitude and a pulse width of the laser beam or a driving pulse for driving the laser beam.

By virtue of such construction, it is possible to preferably perform the recording compensation operation by adjusting the amplitude and the pulse width of the driving pulse or the laser beam.

In another aspect of the embodiment of the recording apparatus of the present invention, it is further provided with: an amplitude limit filtering device for limiting an amplitude level of the read signal by using a predetermined amplitude limit value, thereby obtaining an amplitude limit signal and for performing a high-frequency emphasis filtering process on the amplitude limit signal, thereby obtaining an equalization-corrected signal; and a detecting device for detecting the data pattern of the equalization-corrected signal, the measuring device measuring the jitter of the equalization-corrected signal, the adjusting device adjusting the recording condition such that the jitter which is measured by the measuring device satisfies a desired condition, with reference to the data pattern which is detected by the detecting device.

According to this aspect, by the operation of the amplitude limit filtering device, the amplitude level of the read signal is limited. Specifically, in a signal component of the read signal whose amplitude level is greater than an upper limit of the amplitude limit value or whose amplitude level is less than a lower limit of the amplitude limit value, its amplitude level is limited to the upper limit or the lower limit of the amplitude limit value. On the other hand, in a signal component of the read signal whose amplitude level is less than or equal to the upper limit of the amplitude limit value or whose amplitude level is greater than or equal to the lower limit of the amplitude limit value, its amplitude level is not limited. As described above, the read signal whose amplitude level is limited is referred to as the amplitude limit signal. Moreover, the amplitude limit filtering device performs the high-frequency emphasis filtering process on the amplitude limit signal. As a result, the equalization-corrected signal is obtained in which the shortest data pattern which is included in the read signal (e.g. the data pattern with a run length of 3 T if the information recording medium is a DVD, and the data pattern with a run length of 2 T if the information recording medium is a Blu-ray Disc) has an emphasized amplitude level. In other words, the amplitude limit filtering device performs the same operation as a so-called limit equalizer, on the read signal.

Then, by the operation of the measuring device, the jitter of the equalization-corrected signal is measured, instead of measuring the jitter of the read signal. In other words, in this aspect, instead of directly using the read signal which is obtained by reading the data pattern from the recording medium to measure the jitter, the equalization-corrected signal which is obtained by performing the amplitude limit process and the high-frequency emphasis filtering process on the read signal is used to measure the jitter.

Moreover, by the operation of the detecting device, the data pattern of the equalization-corrected signal is detected. More specifically, it is detected which run length the data pattern of the equalization-corrected signal has. The detected data pattern is referred to in the operation of adjusting the recording condition by the adjusting device.

As described above, the data pattern is detected from the equalization-corrected signal in which the amplitude level of the shortest data pattern is emphasized by the operation of the amplitude limit filtering device (i.e. limit equalizer). Thus, in any state of the asymmetry of the read signal, it is possible to preferably prevent such a disadvantage that the shortest data pattern which is included in the read signal does not cross a zero level. As a result, the shortest data pattern can be preferably detected. Thus, it is possible to preferably adjust the recording condition for recording the shortest data pattern. By this, the recording compensation operation can be preferably performed with reference to the read signal including the shortest data pattern. In other words, regardless of the state of the asymmetry in the read signal before the recording compensation, the recording compensation operation can be preferably performed.

In another aspect of the embodiment of the recording apparatus of the present invention, it is further provided with an adding device for adding a predetermined offset signal to the read signal, thereby obtaining an offset-added signal, the measuring device measuring the jitter of the offset-added signal.

According to this aspect, in accordance with the addition of the offset signal, it is possible to set the asymmetry of the read signal after the recording compensation to the desired value, regardless of the state of the asymmetry before the recording compensation, as detailed later with reference to the drawing.

In another aspect of the embodiment of the recording apparatus of the present invention, the recording device records the recording condition which is adjusted by the adjusting device. In this case, the recording condition is preferably recorded in association with identification information for identifying the information recording apparatus.

According to this aspect, the identification information about the recording apparatus and the recording condition are recorded on the recording medium. Thus, by reading the recording condition, which corresponds to the identification information about the recording apparatus, from the recording medium and by using it as the recording condition of the recording device when the data pattern is recorded by the recording apparatus, it is possible to receive the same various effects as those described above, in the recording operation performed on the recording medium, without adjusting the recording condition again.

Moreover, even if the recording condition is not recorded on the recording medium for the reason that the recording medium is blank or the like, in the embodiment, it is possible to preferably perform the recording compensation operation. Moreover, if the resulting recording condition is recorded on the recording medium in association with the identification information about the recording apparatus, it is possible to receive the same various effects as those described above, in the recording performed on the recording medium, without adjusting the recording condition again next time the data pattern is recorded.

In other words, according to this aspect, without adjusting the recording condition by the adjusting device or with the recording condition adjusted at least once, it is possible to receive the same various effects as those described above, in the recording performed on the recording medium, without adjusting the recording condition on the corresponding recording apparatus again.

(Embodiment of Recording Method)

An embodiment of the information recording apparatus of the present invention is a recording method in a recording apparatus comprising a recording device for recording a data pattern onto a recording medium, the recording method provided with: a first controlling process of controlling the recording device to stop the recording of the data pattern; a reading process of reading the data pattern which is recorded on the recording medium, thereby obtaining a read signal; a measuring process of measuring jitter of the read signal; an adjusting process of adjusting a recording condition of the recording device such that the jitter which is measured by the measuring device satisfies a desired condition; and a second controlling process of controlling the recording device to restart the recording of the data pattern by using the recording condition which is adjusted in the adjusting process.

According to the embodiment of the recording method of the present invention, it is possible to receive the same various effects as those that can be received by the aforementioned embodiment of the recording apparatus of the present invention.

Incidentally, in response to the various aspects in the aforementioned embodiment of the recording apparatus of the present invention, the embodiment of the recording method of the present invention can also adopt various aspects.

(Embodiment of Computer Program)

An embodiment of the computer program of the present invention is a computer program for recording control and for controlling a computer provided in a recording apparatus provided with: a recording device for recording a data pattern onto a recording medium; a first controlling device for controlling the recording device to stop the recording of the data pattern; a reading device for reading the data pattern which is recorded on the recording medium, thereby obtaining a read signal; a measuring device for measuring jitter of the read signal; an adjusting device for adjusting a recording condition of the recording device such that the jitter which is measured by the measuring device satisfies a desired condition; and a second controlling device for controlling the recording device to restart the recording of the data pattern by using the recording condition which is adjusted by the adjusting device (i.e. the embodiment of the recording apparatus of the present invention described above (including its various aspects)), the computer program making the computer function as at least one portion of the recording device, the first controlling device, the reading device, the measuring device, the adjusting device, and the second controlling device.

According to the embodiment of the computer program of the present invention, the aforementioned embodiment of the recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the aforementioned embodiment of the recording apparatus of the present invention, the embodiment of the computer program of the present invention can also adopt various aspects.

An embodiment of the computer program product of the present invention is a computer program product in a computer-readable medium for tangibly embodying a program of instructions executable by a computer provided in a recording apparatus provided with: a recording device for recording a data pattern onto a recording medium; a first controlling device for controlling the recording device to stop the recording of the data pattern; a reading device for reading the data pattern which is recorded on the recording medium, thereby obtaining a read signal; a measuring device for measuring jitter of the read signal; an adjusting device for adjusting a recording condition of the recording device such that the jitter which is measured by the measuring device satisfies a desired condition; and a second controlling device for controlling the recording device to restart the recording of the data pattern by using the recording condition which is adjusted by the adjusting device (i.e. the embodiment of the recording apparatus of the present invention described above (including its various aspects)), the computer program product making the computer function as at least one portion of the recording device, the first controlling device, the reading device, the measuring device, the adjusting device, and the second controlling device.

According to the embodiment of the computer program product of the present invention, the aforementioned embodiment of the recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned embodiment of the recording apparatus of the present invention.

Incidentally, in response to the various aspects in the aforementioned embodiment of the recording apparatus of the present invention, the embodiment of the computer program product of the present invention can also employ various aspects.

(Embodiment of Recording Medium)

A first embodiment of the recording medium of the present invention is a recording medium provided with a recording condition recording area to record therein a recording condition which is adjusted by an information recording apparatus provided with: a recording device for recording a data pattern onto a recording medium; a first controlling device for controlling the recording device to stop the recording of the data pattern; a reading device for reading the data pattern which is recorded on the recording medium, thereby obtaining a read signal; a measuring device for measuring jitter of the read signal; an adjusting device for adjusting the recording condition of the recording device such that the jitter which is measured by the measuring device satisfies a desired condition; and a second controlling device for controlling the recording device to restart the recording of the data pattern by using the recording condition which is adjusted by the adjusting device (i.e. the embodiment of the recording apparatus of the present invention described above (including its various aspects)). In this case, the recording condition is preferably recorded in association with the identification information for identifying the recording apparatus corresponding to the recording condition.

A second embodiment of the recording medium of the present invention is a second recording medium on which a data pattern is recorded by using a recording condition which is adjusted by an information recording apparatus provided with: a recording device for recording the data pattern onto a recording medium; a first controlling device for controlling the recording device to stop the recording of the data pattern; a reading device for reading the data pattern which is recorded on the recording medium, thereby obtaining a read signal; a measuring device for measuring jitter of the read signal; an adjusting device for adjusting the recording condition of the recording device such that the jitter which is measured by the measuring device satisfies a desired condition; and a second controlling device for controlling the recording device to restart the recording of the data pattern by using the recording condition which is adjusted by the adjusting device.

According to the embodiments of the recording medium of the present invention, the identification information about the recording apparatus and the recording condition are recorded on the recording medium. Thus, by reading the recording condition, which corresponds to the identification information about the recording apparatus, from the recording medium and by using it as the recording condition of the recording device when the data pattern is recorded by the recording apparatus, it is possible to receive the same various effects as those described above, in the recording operation performed on the recording medium, without adjusting the recording condition again.

Moreover, even if the recording condition is not recorded on the recording medium for the reason that that the recording medium is blank or the like, in the embodiment, it is possible to preferably perform the recording compensation operation, regardless of the state of the asymmetry in the read signal before the recording compensation as described above, because the data pattern is detected from the equalization-corrected signal in which the amplitude level of the shortest data pattern is emphasized by the operation of the amplitude limit filtering device (i.e. limit equalizer). Moreover, if the resulting recording condition is recorded on the recording medium in association with the identification information about the recording apparatus, it is possible to receive the same various effects as those described above, in the recording performed on the recording medium, without adjusting the recording condition again next time the data pattern is recorded.

In other words, according to the embodiments, without adjusting the recording condition by the adjusting device or with the recording condition adjusted at least once, it is possible to receive the same various effects as those described above, in the recording performed on the recording medium, without adjusting the recording condition on the corresponding recording apparatus again.

Incidentally, the recording condition may be recorded in advance on the recording medium, or it may be recorded along with the recording operation, as occasion demands.

Incidentally, in response to the various aspects in the aforementioned embodiment of the recording apparatus of the present invention, each of the embodiments of the recording medium of the present invention can also employ various aspects.

The operation and other advantages of the present invention will become more apparent from the examples explained below.

As explained above, according to the embodiment of the recording apparatus of the present invention, it is provided with the recording device, the first controlling device, the reading device, the measuring device, the adjusting device, and the second controlling device. According to the embodiment of the recording method of the present invention, it is provided with the first controlling process, the reading process, the measuring process, the adjusting process, and the second controlling process. According to the embodiment of the computer program of the present invention, it makes a computer function as the embodiment of the recording apparatus of the present invention. According to the embodiment of the first recording medium of the present invention, it is provided with the recording condition recording area to record therein the recording condition which is adjusted by the aforementioned adjusting device. According to the second recording medium of the present invention, the data pattern is recorded by using the recording condition which is adjusted by the recording apparatus of the present invention described above. Therefore, it is possible to preferably compensate for the deterioration of the recording properties which is caused by the variation in the recording sensitivity of the recording medium or the like.

EXAMPLES

Hereinafter, examples of the present invention will be described with reference to the drawings.

(1) First Example

Firstly, with reference to FIG. 1 to FIG. 14, a first example of the recording apparatus of the present invention will be explained.

(1-1) Basic Structure

Firstly, with reference to FIG. 1, the basic structure of a recording apparatus in the first example will be described. FIG. 1 is a block diagram conceptually showing the basic structure of a recording apparatus 1 in the first example.

As shown in FIG. 1, the recording apparatus 1 in the first example is provided with a spindle motor 10, a pickup (PU) 11, a HPF (High Pass Filter) 12, an A/D converter 13, a pre-equalizer 14, a binary circuit 16, a decoding circuit 17, a delay circuit 18, an averaging circuit 19, a pattern judgment circuit 20, a recording strategy adjustment circuit 21, and a CPU 22.

The pickup 11 constitutes one specific example of the "recording device" and the "reading device" of the present invention. The pickup 11 photoelectrically converts reflected light when a laser beam LB is applied to a recording surface of an optical disc 100 rotated by the spindle motor 10, thereby generating a read signal $R_{RF}$. Moreover, the pickup 11 irradiates the recording surface of the optical disc 100 with the laser beam LB according to a recording strategy set on the recording strategy setting circuit 21, thereby recording a data pattern onto the optical disc 100.

The HPF 12 removes a low-frequency component of the read signal $R_{RF}$ outputted from the pickup 11, and outputs a resulting read signal $R_{HC}$ to the A/D converter 13.

The A/D converter 13 samples the read signal $R_{RF}$ in accordance with a sampling clock outputted from a PLL (Phased Lock Loop) not illustrated or the like, and outputs a resulting read sample value series RS to the pre-equalizer 14.

The pre-equalizer 14 removes intersymbol interference which is based on transmission characteristics in an information reading system which is formed of the pickup 11 and the optical disc 100, and outputs a resulting read sample value series $RS_C$ to the binary circuit 16.

The binary circuit 16 performs a binary process on the read sample value series $RS_C$, and outputs a resulting binary signal to each of the decoding circuit 17 and the pattern judgment circuit 19.

The decoding circuit 17 performs a decoding process or the like on the binary signal, and outputs a resulting reproduction signal to external reproduction equipment such as a display and a speaker. As a result, data according to the data pattern recorded on the optical disc 100 (e.g. video data, audio data, and the like) is reproduced.

The delay circuit 18 applies a delay corresponding to a time required for the processes of the binary circuit 16 and the pattern judgment circuit 20 to the read sample value series $RS_C$, and then, outputs the read sample value series $RS_C$ to the averaging circuit 19. In other words, by the operations of the delay circuit 18, each sample value in the read sample value series $RS_C$ outputted from the pre-equalizer 14 is inputted to the averaging circuit 19 in the same timing as the timing in which the data pattern judgment result of the sample value is inputted.

The averaging circuit 19 constitutes one specific example of the "measuring device" of the present invention. The averaging circuit 19 measures the jitter of the read sample value series $RS_C$. The details of the averaging circuit 19 will be detailed later (refer to FIG. 5).

The pattern judgment circuit 20 constitutes one specific example of the "detecting device" of the present invention. The pattern judgment circuit 20 judges the data pattern on the basis of the binary signal outputted from the binary circuit 16. Namely, it judges which data pattern the binary signal inputted to the pattern judgment circuit 20 is. The judgment result is outputted to the averaging circuit 19.

The recording strategy adjustment circuit 21 constitutes one specific example of the "adjusting device" of the present invention. The recording strategy adjustment circuit 21 adjusts the recording strategy of each data pattern on the basis of the jitter measured on the averaging circuit 19.

The CPU 22 constitutes one specific example of the "first controlling device" and the "second controlling device" of the present invention. The CPU 22 controls the aforementioned various constituents which constitute the recording apparatus 1, thereby controlling the operations of the recording apparatus 1 as a whole.

(1-2) Optical Disc

Next, with reference to FIG. 2, an explanation will be given on the basic structure of the optical disc 100 which is the target of the recording operation of the recording apparatus 1 in the first example. FIG. 2 is a schematic plan view showing the basic structure of the optical disc 100 and a schematic conceptual view showing a recording area structure in the radial direction of the optical disc 100.

As shown in FIG. 2, the optical disc 100 has a recording surface on a disc main body, for example, with a diameter of about 12 cm as in a DVD. On the recording surface, the optical disc 100 is provided with a center hole 101 as the center; an inner PCA (Power Calibration Area) 111 which constitutes one specific example of the "inner area" of the present invention; a RMA (Recording Management Area) 112; a lead-in area 113; a data recording area 114 which constitutes one specific example of the "user data area" of the present invention; a lead-out area 115; and an outer PCA 116. Moreover, for example, a groove track and a land track are alternatively provided, spirally or concentrically, centered on the center hole 101. Moreover, on the track, the data pattern is divided and recorded by a unit of ECC block. The ECC block is an error-correctable data management unit. Moreover, in the example, the optical disc 100 may be a recordable recording medium which can record the data pattern only once (i.e. DAO), or a rewritable recording medium which can record the data pattern a plurality of times.

Then, the groove track is oscillated with a constant amplitude and at a constant spatial frequency. In other words, the groove track is wobbled, and the cycle of the wobble is set to a predetermined value. On the land track, a pit referred to as a land pre-pit (LPP) is formed which indicates a pre-format address. By virtue of the two addressing (i.e. the wobble and the land pre-pit), it is possible to perform disc rotation control during the recording and to generate a recording clock, as well as obtaining information required for the recording of the data pattern, such as a recording address. Incidentally, the pre-format address may be recorded in advance by modulating the wobble of the groove track by a predetermined modulation method, such as frequency modulation and phase modulation.

(1-3) First Operation Example

Next, with reference to FIG. 3, an explanation will be given on a first operation example of the recording apparatus 1 in the first example (particularly, a recording compensation operation). FIG. 3 is a flowchart conceptually showing a flow of operations in the first operation example of the recording apparatus 1 in the first example.

Firstly, the data pattern is recorded into the data recording area 114 by irradiating the optical disc 100 with the laser beam LB from the pickup 11 under the control of the CPU 22 (step S101).

Here, by the operation of the CPU 22, it is judged whether or not a predetermined time has elapsed since the recording of the data pattern is started (step S102).

As a result of the judgment in the step S102, if it is judged that the predetermined time has not elapsed since the recording of the data pattern is started (the step S102: No), the operational flow returns to the step S101, and the recording of the data pattern is continued.

On the other hand, as a result of the judgment in the step S102, if it is judged that the predetermined time has elapsed since the recording of the data pattern is started (the step S102: Yes), the recording of the data pattern is temporarily stopped under the control of the CPU 22 (step S103).

Then, under the control of the CPU 22, an area portion in which the data pattern is lastly recorded (i.e. an area portion in which the data pattern is recorded immediately before the recording is stopped) is searched for (step S104). Then, by the operation of the averaging circuit 19, the jitter of the data pattern recorded in the area portion searched for in the step S104 is measured (step S105).

Here, with reference to FIG. 4 and FIG. 5, an explanation will be given on the operation in measuring the jitter and the averaging circuit 19 for measuring the jitter. FIG. 4 is a waveform diagram conceptually showing an operation of measuring the jitter by the averaging circuit 19, on the read sample value series $RS_C$. FIG. 5 is a block diagram conceptually showing the basic structure of the averaging circuit 19.

As shown in FIG. 4, in the first example, the averaging circuit 19 firstly measures a difference (i.e. an edge shift in an amplitude direction) between a zero level and a sample value (which is shown by a black circle and which will be hereinafter referred to as a "zero cross sample value" as occasion demands) in the vicinity of the zero cross point of the read sample value series $RS_C$, for each data pattern, in order to measure the jitter. If there is no intersymbol interference in the read signal $R_{RF}$, the sample value that approximately matches the zero level in the timing of a clock CLK becomes the zero cross sample value. If there is the intersymbol interference in the read signal $R_{RF}$, the sample value that is the closest to the zero level in the timing of the clock CLK is the zero cross sample value.

In order to perform such an operation, the averaging circuit 19 is provided with a trigger generation device 1911, a total jitter measurement block 191, n individual shift jitter component measurement blocks 192-1 to 192-n, and a whole shift jitter component measurement circuit 193, as shown in FIG. 5. The number of the individual shift jitter component measurement blocks 192-1 to 192-n is equal to the combination number of types of the data patterns. In other words, if the optical disc 100 is a DVD, there are 10 types of data run lengths (3 T to 11 T, and 14 T). For each mark length, an individual shift jitter can be classified by using the combination pattern of front and rear space lengths. For example, there are 100 combinations of the front space length and each mark length, and there are 100 combinations of the rear space length and each mark: n=200 in total. In view of an effective pupil diameter and the data run length, the same intersymbol interference occurs in the combination patterns of the marks/spaces of 6 T or more. Thus, if the data of 6 T or more are treated as the same group, n can be reduced to n=32. If the optical disc 100 is a Blu-ray Disc, there are 8 types of data run lengths (2 T to 9 T), so that the combination patterns of the front and rear space lengths for each mark length is n=8*8*2=128 combinations. As in the DVD, in view of the effective pupil diameter and the data run length, if the data of 5 T or more are treated as the same group, n can be reduced to n=32. Moreover, each of the individual shift jitter component measurement blocks 192-1 to 192-n measures corresponding one of the individual shift jitter components in the data patterns.

The read sample value series $RS_C$ outputted from the delay circuit 18 is inputted to an ABS circuit 1912 and n adders 1923-1 to 1923-n. Moreover, the pattern judgment result outputted from the pattern judgment circuit 20 is inputted to the trigger generation device 1911.

The trigger generation device 1911 generates a trigger signal which is distinguished in each data pattern and which is at high level (or low level) in timing in which the data pattern is inputted, in accordance with the pattern judgment result outputted from the pattern judgment circuit 20. The trigger signal is inputted to an OR circuit 1917, n sample hold (S/H) circuits 1924-1 to 1924-n, and n counters 1925-1 to 1925-n.

Next, the operation of the total jitter measurement block 191 will be explained. The absolute value of the zero cross sample value outputted from the ABS circuit 1912 is added on an adder 1913. The addition result is sample-held in timing in which any trigger signal is at high level (or low level) (i.e. in timing in which any data pattern is inputted to the total jitter measurement block 191), on a sample-holding circuit 1914. The result is outputted to a divider 1916 and is fed back to the adder 1913. Thus, a sum of the absolute values of the zero cross sample values of all the data patterns is outputted to the divider 1916. On the other hand, a counter 1915 counts the number of times that the trigger signal is at high level (or low level) (i.e. the number of the data patterns inputted to the total jitter measurement block 191). The count result is outputted to the divider 1916. The divider 1916 divides the sum of the absolute values of the zero cross sample values by the number of the data patterns inputted. As a result, an average value of the absolute values of the zero cross sample values is outputted. In the example, the average value of the absolute values of the zero cross sample values is a total jitter (i.e. jitter as a whole, which is obtained in consideration of a random jitter component and a shift jitter component).

Next, the operation of the individual shift jitter component measurement blocks 192-1 to 192-n will be explained. Here, an explanation will be given on the operation of the individual shift jitter component measurement block 192-1 which corresponds to the zero cross sample value of the data pattern of a 3 T mark in the rear of a space with a run length of 3 T when the optical disc 100 is a DVD. By the actions of the adder 1923-1 and the sample-holding circuit 1924-1, in timing in which the trigger signal corresponding to the data pattern of the 3 T mark in the rear of the space with a run length of 3 T is at high level (or low level) (i.e. in timing in which a boundary zero cross sample of the 3 T mark in the rear of the 3 T space is inputted to the individual shift jitter component measurement block 192-1), the boundary zero cross sample of the 3 T mark in the rear of the 3 T space is sample-held. The result is outputted to a divider 1926-1 and is fed back to the adder 1923-1. In other words, on the adder 1923-1, only the boundary zero cross sample value of the 3 T mark in the rear of the 3 T space is integrated, and a sum of the boundary zero cross sample values of the 3 T mark in the rear of the 3 T space is outputted to the divider 1926-1. On the other hand, a counter 1925-1 counts the number of times N(1) that the trigger signal is at high level (or low level) (i.e. the number of the boundary zero cross samples of the 3 T mark in the rear of the 3 T space inputted to the individual shift jitter component measurement block 192-1). The count result is outputted to the divider 1926-1. The divider 1926-1 divides the sum of the boundary zero cross sample values of the 3 T mark in the rear of the 3 T space by the inputted N(1). As a result, an average value S(1) of the boundary zero cross sample values of the 3 T mark in the rear of the 3 T space is outputted. This operation is performed for each corresponding data pattern, on the other individual shift jitter component measurement blocks 192-2 to 192-n. In the example, the average values of the zero cross sample values in the respective data patterns are individual shift jitter components S(1) to S(n).

The individual shift jitter components S(1) to S(n) in the respective data patterns are also outputted to the whole shift jitter component measurement circuit 193. Moreover, the number of times N(1) to N(n) that the trigger signal is at high level are also outputted to the whole shift jitter component measurement circuit 193. On the whole shift jitter component measurement circuit 193, a shift jitter component as a whole obtained in consideration of the occurrence probability of the individual shift jitter components in the respective data patterns is outputted by performing an arithmetic operation shown in an Equation 1.

$$\sqrt{\sum_{i=1}^{n} S(i)^2 \frac{N(i)}{\sum_{j=1}^{n} N(j)}}$$ [Equation 1]

In FIG. 3 again, then, under the control of the CPU 22, it is judged whether or not the individual shift jitter components of the jitter measured in the step S105 are less than a first threshold value (step S106). The judgment is performed in each data pattern. In other words, the judgment is performed on each of the individual shift jitter components measured on the individual shift jitter component measurement blocks 192-1 to 192-n. Specifically, if the optical disc 100 is a DVD and 6 T or more are treated as the same group, the judgment in the data pattern of a front space with a run length of 3 T, the judgment in the data pattern of a front space with a run length of 4 T, the judgment in the data pattern of a front space with a run length of 5 T, and the judgment in the data pattern of a front space of a run length of 6 T are performed with respect to the 3 T mark. In the same manner, the judgments in the data patterns of the front spaces with run lengths of 3 T, 4 T, 5 T, and 6 T or more are performed with respect to marks with 4 T or more. The judgments in the data patterns of rear spaces with run lengths of 3 T, 4 T, 5 T, and 6 T or more are performed with respect to marks with 3 T, 4 T, 5 T, and 6 T or more. Although 6 T or more are treated as the unified group, if the recording compensation is performed with respect to an influence of coma aberration or the like by a tangential tilt, it is possible to treat the influenced data pattern, or individually treat 3 T to 11 T and 14 T. On the other hand, if the optical disc 100 is a Blu-ray Disc and 5 T or more are treated as the same group, the judgment in the data patterns of front spaces or rear spaces with 2 T, 3 T, 4 T, and 5 T or more is performed with respect to marks with 2 T, 3 T, 4 T, and 5 T or more. Although 5 T or more are treated as the unified group, as in the DVD, if the recording compensation is performed with respect to the influence of coma aberration or the like by the tangential tilt, it is possible to treat the influenced data pattern, or individually treat 2 T to 9 T.

Incidentally, a value common to all the data patterns may be used as the first threshold value or an individual value for each data pattern (or each group including a plurality of data patterns) may be used as the first threshold value. Moreover, the specific value of the first threshold value is preferably set to realize that a ratio of the random jitter component to the jitter is greater than or equal to a predetermined value (e.g. approximately 80% as described later). Incidentally, the recording compensation operation may be performed such that the ratio of the random jitter component to the total jitter is greater than or equal to approximately 80%. However, in order to further reduce the total jitter, the recording compensation operation may be performed such that the ratio of the random jitter component to the total jitter is greater than or equal to approximately 90%.

As a result of the judgment in the step S106, if it is judged that the shift jitter components in at least one or all of the data patterns are less than the first threshold value (the step S106: Yes), the recording operation stopped in the step S103 is started again without performing the recording compensation operation under the control of the CPU 22 (step S108). If the recording operation is restarted, the recording of the data pattern is restarted, following a position at which the recording operation is stopped.

On the other hand, as a result of the judgment in the step S106, if it is judged that the shift jitter components in at least one or all of the data patterns are not less than the first threshold value (the step S106: No), the operation of adjusting the strategy, which is the recording compensation operation, is performed (step S107).

Here, the recording compensation may be performed on the data pattern corresponding to the shift jitter component that is judged not to be less than the first threshold value. Alternatively, in addition to the data pattern corresponding to the shift jitter component that is judged not to be less than the first threshold value, the recording compensation may be performed on the data pattern corresponding to the shift jitter component that is judged to be less than the first threshold value.

Here, with reference to FIG. 6, the recording compensation operation in the step S107 in FIG. 3 will be explained. FIG. 6 is a graph conceptually showing the states of the shift jitter components in the respective data patterns and the shift jitter component as a whole before recording compensation and the states of the shift jitter components in the respective data patterns and the shift jitter component as a whole after the recording compensation. The average value of a distribution in each data pattern is the individual shift jitter component.

As shown in FIG. 6, in the first example, such a recording compensation operation is performed that the variations of each of the individual shift jitter components in the respective data patterns is reduced or eliminated. More specifically, if the jitter distributions in the respective data patterns have variations on the basis of the rising point of the clock shown by a longitudinal arrow as shown on the left side of FIG. 6, the recording compensation operation is performed such that the jitter distributions in the respective data patterns are shifted to the rising point of the clock as shown on the right side of FIG. 6. In other words, the recording compensation operation is performed such that the jitter distributions in the respective data patterns match at or in the vicinity or the rising point of the clock. In other words, the recording compensation operation is performed such that the jitter distributions in the respective data patterns are equal. As a result, the jitter distribution as a whole (i.e. total jitter distribution) is a normal distribution centered on the rising position of the clock or the like. Namely, in the recording compensation operation in the example, instead of reducing the widths of the jitter distributions in the respective data patterns (in other words, instead of reducing the random jitter component), the average values of the jitter distributions in the respective data patterns are matched. This corresponds to an operation of reducing the individual shift jitter components in the respective data patterns.

In order to reduce the individual shift jitter components in the respective data patterns, the recording strategy adjustment circuit 21 adjusts the recording strategy, for example, as shown in FIG. 7 to FIG. 9. FIG. 7 is a timing chart conceptually showing a first aspect of the recording strategy adjustment operation. FIG. 8 is a timing chart conceptually showing a second aspect of the recording strategy adjustment operation. FIG. 9 is a timing chart conceptually showing a third aspect of the recording strategy adjustment operation.

For example, as shown in FIG. 7, the pulse width of a recording pulse (i.e. recording strategy) which defines the waveform of the laser beam for recording the data pattern (record data) may be adjusted.

Moreover, as shown in FIG. 8, the amplitudes (e.g. a top pulse amplitude Po, a middle pulse amplitude Pm, a bottom pulse amplitude Pb) of the recording pulse (i.e. recording strategy) which define the waveform of the laser beam for recording the data pattern (record data) may be adjusted. Here, as shown in the recording pulse on the top in FIG. 8, the amplitudes of the recording pulse corresponding to the data patterns with run lengths of 3 T and 4 T and the amplitudes of the recording pulse corresponding to the data patterns with run lengths of 5 T or more may be separately adjusted. Alternatively, as shown in the second recording pulse from the top in FIG. 8, the amplitudes of the recording pulse corresponding to the data pattern with a run length of 3 T, the amplitudes of the recording pulse corresponding to the data pattern with a run length of 4 T, the amplitudes of the recording pulse corresponding to the data pattern with a run length of 5 T, and the amplitudes of the recording pulse corresponding to the data pattern with run lengths of 6 T or more may be separately adjusted. Alternatively, as shown in the third recording pulse from the top in FIG. 8, the amplitudes of the recording pulse corresponding to the data pattern with a run length of 3 T, the amplitudes of the recording pulse corresponding to the data pattern with a run length of 4 T, and the amplitudes of the recording pulse corresponding to the data pattern with run lengths of 5 T or more may be separately adjusted. Alternatively, as shown in the fourth recording pulse from the top in FIG. 8, the amplitudes of the recording pulse corresponding to the data pattern with a run length of 3 T and the amplitudes of the recording pulse corresponding to the data pattern with run lengths of 4 T or more may be separately adjusted.

Moreover, as shown in FIG. 9, even if the recording pulse is not of a castle type, as in the case shown in FIG. 8, the amplitudes of the recording pulse (i.e. the recording strategy) which define the waveform of the laser beam for recording the data pattern (or record data) may be adjusted.

Of course, it is obvious that the recording strategy may be adjusted by combining the adjustment of the pulse width of the recording pulse as shown in FIG. 7 and the adjustment of the amplitudes of the recording pulse as shown in FIG. 8 and FIG. 9, as occasion demands.

As explained above, according to the recording apparatus 1 in the first example, it is possible to reduce the total jitter by performing the recording compensation operation. Moreover, in addition to reducing the total jitter, asymmetry can be also stabilized (in other words, the asymmetry can be maintained to have a preferable value). Now, with reference to FIG. 10 and FIG. 11, the reduction effect of the total jitter and the stabilization effect of the asymmetry in the first example will be explained while contrasting the total jitter with the asymmetry on the recording apparatus for correcting only the power of the laser beam (e.g. the recording apparatus disclosed in the patent document 1 described above) without performing the recording compensation operation. FIG. 10 is graphs conceptually showing the total jitter and the asymmetry of the data patterns recorded by the recording apparatus 1 in the first example. FIG. 11 is graphs conceptually showing the total jitter and the asymmetry on a recording apparatus for correcting only the power of the laser beam LB without performing the recording compensation operation.

As shown in the upper part of FIG. 10, the total jitter of the data patterns recorded by the recording apparatus 1 in the first example can maintain approximately 6% throughout the entire surface of the optical disc 100. In other words, it is possible to reduce the total jitter throughout the entire surface of the optical disc 100. In this case, the asymmetry can be stabilized to be approximately 0% to 2% throughout the front surface of the optical disc 100, as shown in the lower part of FIG. 10.

On the other hand, as shown in the lower part of FIG. 11, the asymmetry of the data patterns recorded by the recording apparatus for correcting only the power of the laser beam LB has some variations; however, it is stabilized to be approximately 2% to 5% throughout the entire surface of the optical disc 100. This is because an operation of correcting the power of the laser beam LB (i.e. Read OPC operation) uses the asymmetry (or a β value) as a parameter, thereby correcting the power such that the asymmetry has substantially the same value. It can be seen, however, as shown in the upper part of FIG. 11, that the total jitter significantly varies depending on the radial position of the optical disc 100. In particular, on the outer circumferential side of the optical disc 100 (in a portion with a radial diameter of 50 mm or more), the total jitter significantly deteriorates. This is because uniformly correcting the power of the laser beam LB causes a shift in the individual shift jitter components in the respective data patterns described above, resulting in the deterioration of the total jitter.

However, according to the recording apparatus 1 in the first example, instead of uniformly correcting only the power of the laser beam LB, the strategy is adjusted, so that it is possible to eliminate the shift in the individual shift jitter components in the respective data patterns. As a result, the total jitter can be preferably reduced. On the other hand, since the strategy is optimally adjusted, the asymmetry can be also preferably stabilized. As described above, according to the recording apparatus 1 in the first example, it can receive such a great benefit that not only the asymmetry but also the total jitter can be maintained to have preferable values, in comparison to the recording apparatus presented in the background art.

(1-4) Second Operation Example

Next, with reference to FIG. 12, a second operation example of the recording apparatus 1 in the first example will be explained. FIG. 12 is a flowchart conceptually showing a flow of operations in the second operation example of the recording apparatus 1 in the first example. Incidentally, the same operation as that in the aforementioned first operation example will carry the same step number, and the detailed explanation thereof will be omitted.

As shown in FIG. 12, even in the second operation example, the operations in the step S101 to the step S104 explained in the first operation example are performed.

Then, by the operation of the averaging circuit 19, the total jitter is measured (step S201). Then, by the operation of the CPU 22, it is judged whether or not the total jitter is less than or equal to a second threshold value (step S202). The second threshold value used here may be, for example, a value determined in the standard of the optical disc 100 or a jitter value that does not influence the recording operation or reproduction operation. Alternatively, the second threshold value may be, for example, 12%, 10%, 8%, or less.

As a result of the judgment in the step S202, if it is judged that the total jitter is less than or equal to the second threshold value (the step S202: Yes), the recording operation stopped in the step S103 is started again without performing the recording compensation operation (the step S108).

On the other hand, as a result of the judgment in the step S202, if it is judged that the total jitter is not less than or equal to the second threshold value (the step S202: No), the operations in the step S105 to the step S107 explained in the first operation example are performed before the recording operation stopped in the step S103 is started again (the step S108).

As described above, according to the second operation example, it is possible to preferably receive the same effects as those that can be received in the first operation example. In addition, if the total jitter is less than or equal to the second threshold value (i.e. if the total jitter is good), the recording compensation operation is not necessarily performed. Thus, it is possible to reduce the operation load of the information recording apparatus 1.

(2) Second Example

Next, with reference to FIG. 13, a second example of the recording apparatus of the present invention will be explained. FIG. 13 is a block diagram conceptually showing the basic structure of a recording apparatus 2 in the second example. Incidentally, the same constituents as those of the aforementioned information recording apparatus 1 in the first example will carry the same referential numerals, and the explanation thereof will be omitted.

As shown in FIG. 13, the recording apparatus 2 in the second example is provided with a spindle motor 10, a pickup 11, a HPF 12, an A/D converter 13, a pre-equalizer 14, a binary circuit 16, a decoding circuit 17, a delay circuit 18, an averaging circuit 19, a pattern judgment circuit 20, a recording strategy adjustment circuit 21, and a CPU 22, as in the recording apparatus 1 in the first example.

The recording apparatus 2 in the second example is provided particularly with a limit equalizer 15 between the pre-equalizer 14 and the binary circuit 16. The limit equalizer 15 constitutes one specific example of the "amplitude limit filtering device" of the present invention. The limit equalizer 15 performs a high-frequency emphasis process on the read sample value series $RS_C$ without increasing the intersymbol interference, and outputs a resulting high-frequency emphasized read sample value series $RS_H$ to each of the binary circuit 16 and the delay circuit 18. Incidentally, the operations of the limit equalizer 15 are the same as those of a conventional limit equalizer. Please refer to Japanese Patent publication No. 3459563 for the details.

As a result, the binary circuit 16, the decoding circuit 17, the delay circuit 18, the averaging circuit 19, the pattern judgment circuit 20, the recording strategy adjustment circuit 21, and the CPU 22 located after the limit equalizer 15 use the high-frequency emphasized read sample value series $RS_H$ to perform the operations, instead of the read sample value series $RS_C$.

As described above, according to the second example, the pattern judgment is performed as well as performing the recording compensation operation, by using the output of the limit equalizer 15 (i.e. the high-frequency emphasized read sample value series $RS_H$). In other words, the pattern judgment is performed as well as performing the recording compensation operation, with the amplitude level of the shortest data pattern emphasized. In any states of the asymmetry of the read signal (e.g. in a case where the asymmetry is significantly shifted, such as in a case where an error is made in the power selection of OPC and in a case where the recording is to be suddenly performed near the outer circumference after the OPC is performed in order to additionally record the data pattern onto an optical disc with the data pattern already recorded), it is possible to preferably prevent such a state that the shortest data pattern included in the read signal does not cross the zero level. As a result, the shortest data pattern can be preferably detected. This preferably allows the recording compensation operation to be performed with reference to the read signal including the shortest data pattern. In other words, regardless of the state of the asymmetry in the read signal before the recording compensation, the recording compensation operation can be preferably performed.

(3) Third Example

Next, with reference to FIG. 14, a third example of the recording apparatus of the present invention will be explained. FIG. 14 is a block diagram conceptually showing the basic structure of a recording apparatus 3 in the third example. Incidentally, the same constituents as those of the aforementioned recording apparatus 1 in the first example and the recording apparatus 2 in the second example will carry the same referential numerals, and the explanation thereof will be omitted.

As shown in FIG. 14, the recording apparatus 3 in the third example is provided with a spindle motor 10, a pickup 11, a HPF 12, an A/D converter 13, a pre-equalizer 14, a limit equalizer 15, a binary circuit 16, a decoding circuit 17, a delay circuit 18, an averaging circuit 19, a pattern judgment circuit 20, a recording strategy adjustment circuit 21, and a CPU 22, as in the recording apparatus 2 in the second example.

The recording apparatus 3 in the third example is provided particularly with an adder 23 and a reference level detection circuit 24, each of which constitutes one specific example of the "adding device" of the present invention.

The reference level detection circuit 24 outputs a difference between the asymmetry which is actually detected and the asymmetry which is targeted, as offset OFS to the adder 23. On the adder 23, the OFS outputted from the reference level detection circuit 24 is added to the high-frequency emphasized read sample value series $RS_H$ outputted from the limit equalizer 15. This allows the reference level of the high-frequency emphasized read sample value series $RS_H$ to be set to a predetermined value.

Incidentally, a signal detected from the read signal on the reference level detection circuit 24 is not limited to the aforementioned asymmetry but may be a β value. Alternatively, it may be a partial β value indicating the deviation between the amplitude center of the read signal corresponding to the record data with the shortest run length and the amplitude center of the read signal corresponding to the record data with the second shortest run length. Alternatively, it may be an α value indicating a deviation ratio (or rate) of the amplitude center of the read signal corresponding to the record data with the shortest run length, with respect to the amplitude center (i.e. the reference level, and the zero level in the example) of the read signals corresponding to the respective record data with all types of run lengths (e.g. the record data with each of run lengths of 3 T to 11 T and 14 T if the optical disc 100 is a DVD, and the record data with each of run lengths of 2 T to 9 T if the optical disc 100 is a Blu-ray Disc).

By adopting such a structure, the recording apparatus 3 in the third example can change the reference level, thereby arbitrarily setting the asymmetry of the read signal after the recording compensation. Therefore, it is possible to perform the recording compensation operation which realizes an optimum jitter value and the desired asymmetry. For example, if the optical disc 100 is a DVD, it is possible to perform the recording compensation operation which realizes the minimum jitter value and the asymmetry of +5%. In the same manner, if the optical disc 100 is a Blu-ray Disc, it is possible to perform the recording compensation operation which realizes the minimum jitter value and the asymmetry of +2.5%.

Moreover, since the asymmetry of the read signal after the recording compensation can be set to a desired value without depending on the asymmetry of the read signal before the recording compensation, it is possible to perform the good recording compensation operation even if the asymmetry varies depending on the individual difference of the optical disc 100 and the recording apparatus 3.

Moreover, since such construction that the offset corresponding to the difference between the detected asymmetry and the target asymmetry (i.e. such construction that the desired asymmetry is obtained after the recording compensation by adding the offset to the asymmetry before the recording compensation) is adopted, it is possible to set the asymmetry to the desired value even if the asymmetry before the recording compensation varies due to the recording compensation operation which is performed a plurality of times.

Moreover, since it is unnecessary to adjust the asymmetry by adjusting the recording power (i.e. the amplitude of the recording pulse), it is possible to simplify an operation of adjusting a recording condition, and it is also possible to reduce a time required for the operation of adjusting the recording condition.

Incidentally, in the third example, the recording compensation operation is performed by using the high-frequency emphasized read sample value series $RS_H$ outputted from the limit equalizer 15. However, from the viewpoint that the asymmetry of the read signal after the recording compensation can be set to the desired value, the recording compensation operation is not necessarily performed by using the high-frequency emphasized read sample value series $RS_H$ outputted from the limit equalizer 15. In other words, even if the recording compensation operation is performed by using the read sample value series $RS_C$ outputted from the pre-equalizer 14, obviously, it is possible to receive the effect that the asymmetry of the read signal after the recording compensation can be set to the desired value. Therefore, in the third example, the limit equalizer 15 is not necessarily provided.

Incidentally, the result of the recording compensation operation may be recorded onto the optical disc 100 at each time of the recording operation, as occasion demands. Namely, it may be recorded onto the optical disc 100 when the recording operation is performed by a user, as occasion demands. Alternatively, it may be recorded on the optical disc 100 in advance by using embossed pits, prewriting, or the like, in the manufacturing of the optical disc 100. In this case, it may be recorded in the RMA 112 shown in FIG. 2, a CDZ (Control Data Zone) in the lead-in area 113, or another area portion. In any cases, the aforementioned effects can be preferably received. In this case, information indicating the result of the recording compensation operation is preferably recorded in association with identification information which can identify the recording apparatus 1 (or 2 or 3) which has performed the recording compensation operation.

As described above, by recording the information indicating the result of the recording compensation operation and the identification information which can identify the recording apparatus 1 that has performed the recording compensation operation onto the optical disc 100, it is possible to read the result of the recording compensation operation corresponding to the identification information about the recording apparatus 1, from the optical disc 100, when the data pattern is recorded by the recording apparatus 1. Thus, if the read result of the recording compensation operation is used to set the aforementioned recording condition, it is possible to receive the same various effects as those described above, in the recording operation performed on the optical disc 100 without the recording compensation operation.

Moreover, even if the result of the recording compensation operation corresponding to the identification information about the recording apparatus 1 is not recorded on the optical disc 100, the same effects can be appropriately received by reading a result of the recording compensation operation corresponding to identification information close to the identification information about the recording apparatus 1 (in other words, identification information about another recording apparatus which has a similar property to that of the recording apparatus 1) and by using the read result of the recording compensation operation to set the aforementioned recording condition. Alternatively, the same effects can be also appropriately received by performing the simple recording compensation operation on the basis of the result of the recording compensation operation corresponding to the identification information close to the identification information about the recording apparatus 1.

Moreover, even if the information indicating the result of the recording compensation operation is not recorded on the optical disc 100 for the reason that the optical disc 100 is blank or the like, the recording compensation operation can be preferably performed by using each of the recording apparatuses in the aforementioned examples. Moreover, if the resulting recording condition is recorded on the optical disc 100 in association with the identification information about the recording apparatus 1, it is possible to receive the same various effects as those described above, in the recording performed on the optical disc 100, without going to the trouble of performing the recording compensation operation.

In other words, without performing the recording compensation operation or with the recording compensation operation performed at least once, it is possible to receive the same various effects as those described above, in the recording performed on the optical disc 100, without going to the trouble of performing the recording compensation operation on the corresponding recording apparatus 1. Therefore, it is possible to reduce the number of times that the recording compensation operation is performed, thereby saving an area required for the recording compensation operation.

The present invention is not limited to the aforementioned examples, but various changes may be made, if desired, without departing from the essence or spirit of the invention which can be read from the claims and the entire specification. A recording apparatus and method, a computer program, and a recording medium, all of which involve such changes, are also intended to be within the technical scope of the present invention.

The invention claimed is:

1. A recording apparatus comprising:
   a recording device for recording a data pattern onto a recording medium;
   a first controlling device for controlling the recording device to stop the recording of the data pattern;
   a reading device for reading the data pattern which is recorded immediately before the recording is stopped, thereby obtaining a read signal;
   an adding device for adding a predetermined offset signal to the read signal, thereby obtaining an offset-added signal;
   a measuring device for measuring jitter of the offset-added signal;
   an adjusting device for adjusting a recording condition of the recording device such that the jitter which is measured by the measuring device satisfies a desired condition; and
   a second controlling device for controlling the recording device to restart the recording of the data pattern by using the recording condition which is adjusted by the adjusting device,
   the offset signal being a signal corresponding to a difference between an asymmetry of the read signal and target asymmetry.

2. The information recording apparatus according to claim 1, wherein
   the recording medium comprises a data recording area to record therein the data pattern corresponding to user data, and
   the first controlling device controls the recording device to stop the recording of the data pattern in arbitrary timing of recording the data pattern corresponding to the user data into the data recording area.

3. The information recording apparatus according to claim 1, wherein
   the measuring device measures, as the jitter, a shift jitter component which is caused by a state of the recorded data pattern from among the jitter, and
   the adjusting device adjusts the recording condition such that the shift jitter component as the jitter satisfies the desired condition.

4. The information recording apparatus according to claim 3, wherein a state in which the jitter satisfies the desired condition is a state in which the shift jitter component is less than or equal to a first predetermined value.

5. The information recording apparatus according to claim 3, wherein a state in which the jitter satisfies the desired condition is a state in which a ratio of a random jitter component, which is caused by a noise from among the jitter, to the jitter is greater than or equal to a second predetermined value.

6. The information recording apparatus according to claim 3, wherein a state in which the jitter satisfies the desired condition is a state in which the shift jitter components in a plurality of types of respective data patterns with different run lengths are substantially same to each other.

7. The information recording apparatus according to claim 3, wherein the measuring device measures, as the shift jitter component, an average value in each data pattern of sample values of the read signal which is the closest to a zero level point.

8. The information recording apparatus according to claim 3, wherein the adjusting device preferentially adjusts the recording condition which is used to record the data pattern having the relatively large shift jitter component out of a plurality of types of the data patterns with different run lengths.

9. The information recording apparatus according to claim 1, wherein
   the recording device applies a laser beam, thereby recording the data pattern, and
   the recording condition is at least one of an amplitude and a pulse width of the laser beam or a driving pulse for driving the laser beam.

10. The information recording apparatus according to claim 1, further comprising:
    an amplitude limit filtering device for limiting an amplitude level of the read signal by using a predetermined amplitude limit value, thereby obtaining an amplitude limit signal and for performing a high-frequency emphasis filtering process on the amplitude limit signal, thereby obtaining an equalization-corrected signal; and
    a detecting device for detecting the data pattern of the equalization-corrected signal,
    the measuring device measuring the jitter of the equalization-corrected signal,
    the adjusting device adjusting the recording condition such that the jitter which is measured by the measuring device satisfies a desired condition, with reference to the data pattern which is detected by the detecting device.

11. The information recording apparatus according to claim 1, wherein the recording device records the recording condition which is adjusted by the adjusting device.

12. A recording method in a recording apparatus comprising a recording device for recording a data pattern onto a recording medium, the recording method comprising:
a first controlling process of controlling the recording device to stop the recording of the data pattern;
a reading process of reading the data pattern which is recorded on the recording medium, thereby obtaining a read signal;
an adding process of adding a predetermined offset signal to the read signal, thereby obtaining an offset-added signal;
a measuring process of measuring jitter of the offset-added signal;
an adjusting process of adjusting a recording condition of the recording device such that the jitter which is measured by the measuring device satisfies a desired condition; and
a second controlling process of controlling the recording device to restart the recording of the data pattern by using the recording condition which is adjusted in the adjusting process,
the offset signal being a signal corresponding to a difference between an asymmetry of the read signal and target asymmetry.

13. A computer readable recording medium recording thereon a computer program for recording control and for controlling a computer provided in a recording apparatus comprising: a recording device for recording a data pattern onto a recording medium; a first controlling device for controlling the recording device to stop the recording of the data pattern; a reading device for reading the data pattern which is recorded on the recording medium, thereby obtaining a read signal; an adding device for adding a predetermined offset signal to the read signal, thereby obtaining an offset-added signal; a measuring device for measuring jitter of the offset-added signal; an adjusting device for adjusting a recording condition of the recording device such that the jitter which is measured by the measuring device satisfies a desired condition; and a second controlling device for controlling the recording device to restart the recording of the data pattern by using the recording condition which is adjusted by the adjusting device, the offset signal being a signal corresponding to a difference between an asymmetry of the read signal and target asymmetry, the computer program making the computer function as at least one portion of the recording device, the first controlling device, the reading device, the measuring device, the adjusting device, and the second controlling device.

14. A recording medium comprising a recording condition recording area to record therein a recording condition which is adjusted by an information recording apparatus comprising: a recording device for recording a data pattern onto a recording medium; a first controlling device for controlling the recording device to stop the recording of the data pattern; a reading device for reading the data pattern which is recorded on the recording medium, thereby obtaining a read signal; an adding device for adding a predetermined offset signal to the read signal, thereby obtaining an offset-added signal; a measuring device for measuring jitter of the offset-added signal; an adjusting device for adjusting the recording condition of the recording device such that the jitter which is measured by the measuring device satisfies a desired condition; and a second controlling device for controlling the recording device to restart the recording of the data pattern by using the recording condition which is adjusted by the adjusting device, the offset signal being a signal corresponding to a difference between an asymmetry of the read signal and target asymmetry.

15. A recording medium on which a data pattern is recorded by using a recording condition which is adjusted by an information recording apparatus comprising: a recording device for recording the data pattern onto a recording medium; a first controlling device for controlling the recording device to stop the recording of the data pattern; a reading device for reading the data pattern which is recorded on the recording medium, thereby obtaining a read signal; an adding device for adding a predetermined offset signal to the read signal, thereby obtaining an offset-added signal; a measuring device for measuring jitter of the offset-added signal; an adjusting device for adjusting the recording condition of the recording device such that the jitter which is measured by the measuring device satisfies a desired condition; and a second controlling device for controlling the recording device to restart the recording of the data pattern by using the recording condition which is adjusted by the adjusting device, the offset signal being a signal corresponding to a difference between an asymmetry of the read signal and target asymmetry.

* * * * *